US008455563B2

(12) United States Patent
Parri et al.

(10) Patent No.: US 8,455,563 B2
(45) Date of Patent: Jun. 4, 2013

(54) REACTIVE MESOGENIC COMPOUNDS AND MIXTURES

(75) Inventors: Owain Llyr Parri, Hampshire (GB); Donald Gordon Graham, Dorset (GB); Alison Linda May, Dorset (GB)

(73) Assignee: Merck Patent GmbH, Darmstadt (DE)

( * ) Notice: Subject to any disclaimer, the term of this patent is extended or adjusted under 35 U.S.C. 154(b) by 101 days.

(21) Appl. No.: 12/812,264

(22) PCT Filed: Dec. 22, 2008

(86) PCT No.: PCT/EP2008/011035
§ 371 (c)(1),
(2), (4) Date: Feb. 1, 2011

(87) PCT Pub. No.: WO2009/086911
PCT Pub. Date: Jul. 16, 2009

(65) Prior Publication Data
US 2011/0178200 A1 Jul. 21, 2011

(30) Foreign Application Priority Data
Jan. 11, 2008 (EP) .................... 08000486

(51) Int. Cl.
*B01F 3/04* (2006.01)
*C08G 18/67* (2006.01)
*C07C 315/00* (2006.01)
*C07C 381/00* (2006.01)
*C09K 15/04* (2006.01)

(52) U.S. Cl.
USPC ............. 522/173; 522/174; 568/18; 568/77; 252/399.01; 252/399.62

(58) Field of Classification Search
USPC ..... 252/299.01, 299.62; 568/18, 77; 522/173, 522/174; 349/183
See application file for complete search history.

(56) References Cited

U.S. PATENT DOCUMENTS

| 5,332,522 | A | 7/1994 | Chen et al. |
| 6,514,578 | B1 * | 2/2003 | Farrand ............. 428/1.1 |
| 7,170,575 | B2 * | 1/2007 | Coates et al. ............ 349/123 |
| 7,597,942 | B2 * | 10/2009 | May et al. ............ 428/1.1 |
| 7,771,801 | B2 * | 8/2010 | Farrand ............. 428/1.1 |
| 7,794,621 | B2 * | 9/2010 | Schott et al. ............ 252/299.01 |
| 8,021,571 | B2 * | 9/2011 | May et al. ............ 252/299.6 |
| 2002/0017633 | A1 * | 2/2002 | Goulding et al. ......... 252/299.5 |
| 2006/0166033 | A1 * | 7/2006 | Poetsch et al. ............ 428/690 |
| 2008/0143943 | A1 | 6/2008 | May et al. |

FOREIGN PATENT DOCUMENTS

| WO | WO 2006/027076 A1 | 3/2006 |
| WO | WO 2006/039980 A1 | 4/2006 |
| WO | WO2007/039105 | * 4/2007 |

OTHER PUBLICATIONS

International Search Report of PCT/EP2008/011035 (Feb. 11, 2009).

* cited by examiner

*Primary Examiner* — Ling Choi
*Assistant Examiner* — Jessica E Whiteley
(74) *Attorney, Agent, or Firm* — Millen, White, Zelano & Branigan, P.C.

(57) ABSTRACT

The invention relates to new reactive mesogenic compounds (RM), polymerisable liquid crystal (LC) mixtures and polymers comprising them, and the use of the compounds, mixtures and polymers in optical, electrooptical, electronic, semiconducting or luminescent components or devices, in decorative, security or cosmetic applications, especially for use in polymer films having high optical dispersion.

24 Claims, 5 Drawing Sheets

REACTIVE MESOGENIC COMPOUNDS AND MIXTURES

FIELD OF THE INVENTION

The invention relates to new reactive mesogenic compounds (RM), polymerisable liquid crystal (LC) mixtures comprising them, polymer films obtained thereof, and the use of the compounds, mixtures and polymer films in optical, electrooptical, electronic, semiconducting or luminescent components or devices, in decorative, security or cosmetic applications, especially for use in polymer films having high optical dispersion.

BACKGROUND AND PRIOR ART

RMs can be used to make optical films, like compensation, retardation or polarisation films, e.g. for use as components of optical or electrooptical devices like LC displays, through the process of in-situ polymerisation. The optical properties of the films can be controlled by many different factors, such as mixture formulation or substrate properties. The optical properties of the film can also be controlled by changing the birefringence of the mixture. This determines the necessary thickness for a given retardation at a particular angle as well as controlling the birefringence dispersion. High birefringence materials also give high birefringence dispersion whilst low birefringence materials give low birefringence dispersion.

There is a need to prepare anisotropic polymer films having a higher optical dispersion than that achieved with RM materials and mixtures as disclosed in the literature to date. In particular there is a need for anisotropic polymer films with the optical properties of a "negative C" film that can also have exceptionally high birefringence dispersion.

The dispersive power of an RM film can be defined in many ways, however one common way is to measure the optical retardation at 450 nm ($R_{450}$) and divide this by the optical retardation measured at 550 nm ($R_{550}$) to obtain the ratio $R_{450}/R_{550}$. In the case of a polymer film having the optical properties of a negative C plate, the on-axis retardation is substantially zero, and the retardation of the film becomes increasingly negative as the angle of measurement deviates from normal. The dispersive power of a negative C film does slightly change with measurement angle, and generally decreases with increasing angle. FIG. 1 shows a typical plot of retardation against wavelength, measured at an angle of +40° off normal, in this case for a polymerised negative C film made from the commercially available reactive mesogen mixture RMM482 (Merck KgaA, Darmstadt, Germany). The optical dispersion $R_{450}/R_{550}$ for this film is 1.081.

The origin of the retardation dispersion is due to the fact that the two refractive indices $n_e$, $n_o$ of the anisotropic molecules (wherein $n_e$ is the "extraordinary refractive index" in the direction parallel to the long molecular axis, and $n_o$ is the "ordinary refractive index" in the directions perpendicular to the long molecular axis) in the anisotropic film change with wavelength at different rates, with $n_e$ changing more rapidly than $n_o$ towards the blue end of the spectrum. One way of preparing a material with high retardation dispersion is to design molecules with increased $n_e$ dispersion whilst keeping $n_o$ dispersion largely unchanged. The optics of coatable negative C RM films has been disclosed for example in WO 2004/013666 A1.

One aim of this invention is to provide polymerisable materials, especially RMs and mixtures thereof, that are designed to have a higher $n_e$ than is commonly found in commercially available RM materials, and can be processed into optically anisotropic polymer films, especially negative C films, having higher retardation dispersion compared to films made from presently available RM mixtures. Another aim of the invention is to extend the pool of RM materials available to the expert. Other aims are immediately evident to the expert from the following description.

It has been found that these aims can be achieved by providing reactive mesogenic compounds and mixtures as claimed in the present invention.

In particular, it has been found that by using RMs with a tolane group and a terminal —NCS group it is possible to provide polymerisable LC mixtures and polymer films with high optical dispersion.

U.S. Pat. No. 5,332,522 discloses chiral nematic copolymers comprising chiral and achiral mesogenic groups in the side chain, wherein the achiral mesogenic side chain may also comprise a tolane group and a terminal NCS group. However, this document does neither disclose nor suggest RMs according to the present invention, or their use in polymerisable LC materials or optical films with high optical dispersion.

SUMMARY OF THE INVENTION

The invention relates to compounds of formula I (isothiocyanate RMs)

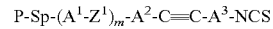

$$P\text{-}Sp\text{-}(A^1\text{-}Z^1)_m\text{-}A^2\text{-}C\equiv C\text{-}A^3\text{-}NCS \qquad\qquad I$$

wherein
P is a polymerisable group,
Sp is a spacer group or a single bond,
$A^1$ is, in case of multiple occurrence independently of one another, selected from carbocylic, heterocyclic, aromatic or heteroaromatic groups, which are optionally substituted by one or more groups L,
$A^2$ and $A^3$ are independently of each other selected from 1,4-phenylene or naphthalene-2,6-diyl, wherein one or more CH groups may be replaced by N, and which are optionally substituted by one or more groups L,
$Z^1$ is in case of multiple occurrence independently of one another selected from —O—, —S—, —CO—, —COO—, —OCO—, —O—COO—, —CO—NR°—, —NR°—CO—, —NR°—CO—NR°—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR°—, —C≡C—, —CH=CH—COO—, —OCO—CH=CH—, CR°R°° or a single bond,
L is in case of multiple occurrence independently of one another selected from P-Sp-, F, Cl, Br, I, —CN, —NO$_2$, —NCO, —NCS, —OCN, —SCN, —C(=O)NR°R°°, —C(=O)X, —C(=O)OR°, —C(=O)R°, —NR°R°°, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein X is halogen,
$Y^1$ and $Y^2$ independently of each other denote H, F, Cl or CN,
$R°$ and $R°°$ are independently of each other H or alkyl with 1 to 12 C-atoms,
m is 0, 1, 2, 3 or 4,
wherein, in case m is 0, one or both of $A^2$ and $A^3$ denote 1,4-phenylene that is at least monosubstituted by L, or optionally substituted naphthalene-2,6-diyl.

The invention further relates to an LC material comprising one or more compounds of formula I.

The invention further relates to a polymerisable material, preferably a polymerisable LC material, comprising one or more compounds of formula I and optionally comprising one or more further compounds that are preferably polymerisable and/or mesogenic or liquid crystalline.

The invention further relates to an anisotropic polymer obtained by polymerising a compound of formula I or a polymerisable LC material as described above, preferably in its oriented state in form of a thin film.

The invention further relates to the use of compounds, materials and polymers as described above and below in optical films with high optical dispersion.

The invention further relates to the use of compounds, materials and polymers as described above and below in electrooptical displays, LCDs, optical films, polarisers, compensators, beam splitters, reflective films, alignment layers, colour filters, holographic elements, hot stamping foils, coloured images, decorative or security markings, LC pigments, adhesives, cosmetics, non-linear optics, optical information storage, electronic devices, organic semiconductors, field effect transistors (FET), components of integrated circuitry (IC), thin film transistors (TFT), Radio Frequency Identification (RFID) tags, organic light emitting diodes (OLED), electroluminescent displays, lighting devices, photovoltaic devices, sensor devices, electrode materials, photoconductors, electrophotographic recording, lasing materials or devices.

TERMS AND DEFINITIONS

Figure 1:
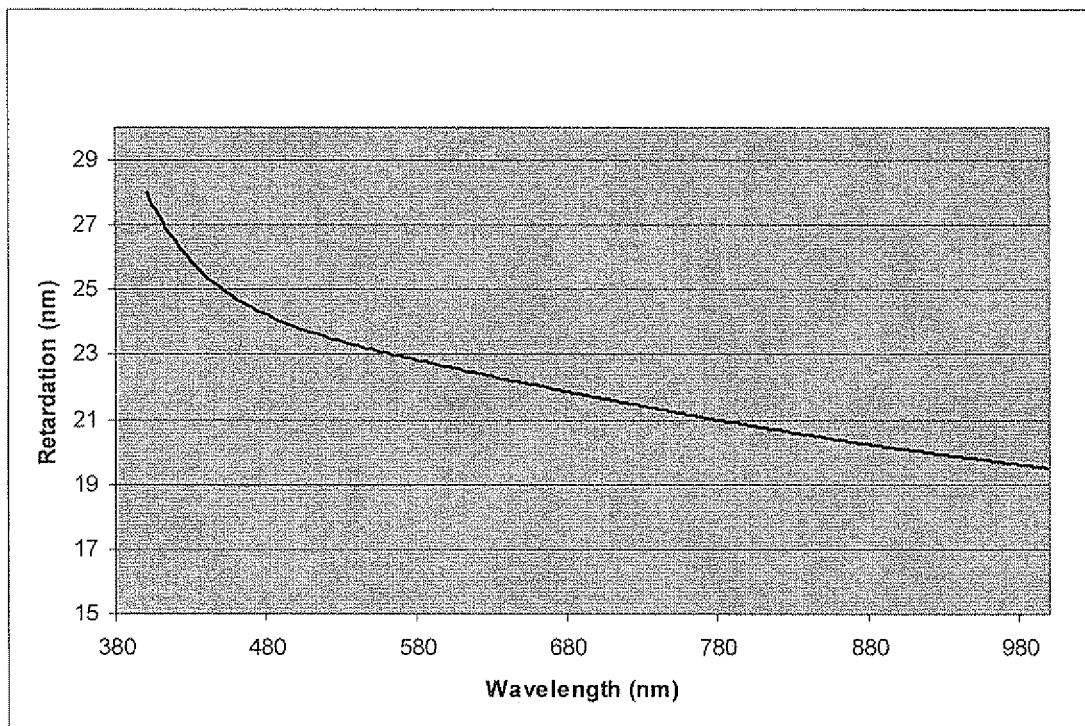
FIG. 1 shows the birefringence versus wavelength plot for a polymerised film made from a reactive mesogen mixture of prior art.

The term "liquid crystal or mesogenic compound" means a compound comprising one or more calamitic (rod- or board/lath-shaped) or discotic (disk-shaped) mesogenic groups.

The term "calamitic compound" or "calamitic group" means a rod- or board/lath-shaped compound or group.

The term "mesogenic group" means a group with the ability to induce liquid crystal (LC) phase behaviour. The compounds comprising mesogenic groups do not necessarily have to exhibit an LC phase themselves. It is also possible that they show LC phase behaviour only in mixtures with other compounds, or when the mesogenic compounds or the mixtures thereof are polymerised. For the sake of simplicity, the term "liquid crystal" is used hereinafter for both mesogenic and LC materials. For an overview of definitions see Pure Appl. Chem. 73(5), 888 (2001) and C. Tschierske, G. Pelzl and S. Diele, Angew. Chem. 2004, 116, 6340-6368.

The term "spacer" or "spacer group", also referred to as "Sp" below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless stated otherwise, the term "spacer" or "spacer group" above and below denotes a flexible organic group, which in a polymerisable mesogenic compound ("RM") connects the mesogenic group and the polymerisable group(s).

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" (RM) means a polymerisable mesogenic or liquid crystal compound.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" compounds.

The term "film" includes rigid or flexible, self-supporting or free-standing films with mechanical stability, as well as coatings or layers on a supporting substrate or between two substrates.

The term "carbyl group" means any monovalent or multivalent organic radical moiety which comprises at least one carbon atom either without any non-carbon atoms (like for example —C≡C—), or optionally combined with at least one non-carbon atom such as N, O, S, P, Si, Se, As, Te or Ge (for example carbonyl etc.). The term "hydrocarbyl group" denotes a carbyl group that does additionally contain one or more H atoms and optionally contains one or more hetero atoms like for example N, O, S, P, Si, Se, As, Te or Ge. A carbyl or hydrocarbyl group comprising a chain of 3 or more C atoms may also be linear, branched and/or cyclic, including spiro and/or fused rings.

The "optical retardation" at a given wavelength $R(\lambda)$ (in nm) of a layer of liquid crystalline or birefringent material is defined as the product of birefringence at that wavelength $\Delta n(\lambda)$ and layer thickness d (in nm) according to the equation $$R(\lambda) = \Delta n(\lambda) \cdot d$$

The optical retardation R represents the difference in the optical path lengths in nanometers traveled by S-polarised and P-polarised light whilst passing through the birefringent material. "On-axis" retardation means the retardation at normal incidence to the sample surface.

The term "positive (optical) dispersion" refers to a birefringent or liquid crystalline material or layer that displays "normal" birefringence dispersion, i.e. where the magnitude of the birefringence ($\Delta n$) decreases with increasing wavelength ($\lambda$). i.e $|\Delta n(450)| > |\Delta n(550)|$, or $\Delta n(450)/\Delta n(550) > 1$, where $\Delta n(450)$ and $\Delta n(550)$ are the birefringence of the material measured at wavelengths of 450 nm and 550 nm respectively. In contrast, negative (optical) dispersion" means a material or layer having $|\Delta n(450)| < |\Delta n(550)|$ or $\Delta n(450)/\Delta n(550) < 1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Since the optical retardation at a given wavelength is defined as the product of birefringence and layer thickness as described above $[R(\lambda) = \Delta n(\lambda) \cdot d]$, the optical dispersion can be expressed either as the "birefringence dispersion" by the ratio $\Delta n(450)/\Delta n(550)$, or as "retardation dispersion" by the ratio R(450)/R(550), wherein R(450) and R(550) are the retardation of the material measured at wavelengths of 450 nm and 550 nm respectively. Since the layer thickness d does not change with the wavelength, R(450)/R(550) is equal to Δn(450)/Δn(550). Thus, a material or layer with positive or normal dispersion has R(450)/R(550)>1 or |R(450)|>|R(550)|.

In the present invention, unless stated otherwise "optical dispersion" means the retardation dispersion, i.e. the ratio R(450)/R(550).

The retardation (R(λ)) of a material can be measured using a spectroscopic ellipsometer, for example the M2000 spectroscopic ellipsometer manufactured by J. A. Woollam Co., This instrument is capable of measuring the optical retardance in nanometers of a birefringent sample e.g. Quartz over a range of wavelengths typically, 370 nm to 2000 nm. From this data it is possible to calculate the dispersion (R(450)/R(550) or Δn(450)/Δn(550)) of a material.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements", in accordance with the measurement procedures described in "Retardation Measurement (RetMeas) Manual (2002)" and "Guide to WVASE (2002)" (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

For the purpose of this invention, unless stated otherwise, dispersion measurements are carried out at an angle of +/−40°.

The term "C plate" refers to an optical retarder utilizing a layer of uniaxially birefringent material with its extraordinary axis perpendicular to the plane of the layer. In C-plates comprising optically uniaxial birefringent liquid crystal material with uniform orientation, the optical axis of the film is given by the direction of the extraordinary axis. A C plate comprising optically uniaxial birefringent material with positive birefringence is also referred to as "+C plate" or "positive C plate". A C plate comprising a film of optically uniaxial birefringent material with negative birefringence is also referred to as "−C plate" or "negative C plate".

DETAILED DESCRIPTION OF THE INVENTION

Especially preferred are compounds of formula I wherein
$A^2$ is 1,4-phenylene or naphthalene 2,6-diyl, each being optionally substituted with one or more groups L,
$A^3$ is 1,4-phenylene or naphthalene 2,6-diyl, each being optionally substituted with one or more groups L,
$A^1$ is 1,4-phenylene or naphthalene 2,6-diyl, each being optionally substituted with one or more groups L,
$Z^1$ is —COO—, —OCO—, —C≡C— or a single bond, very preferably —COO— or —C≡C—,
m is 0,
m is 1.

Very preferably the compounds of formula I are selected from the group consisting of the following subformulae:

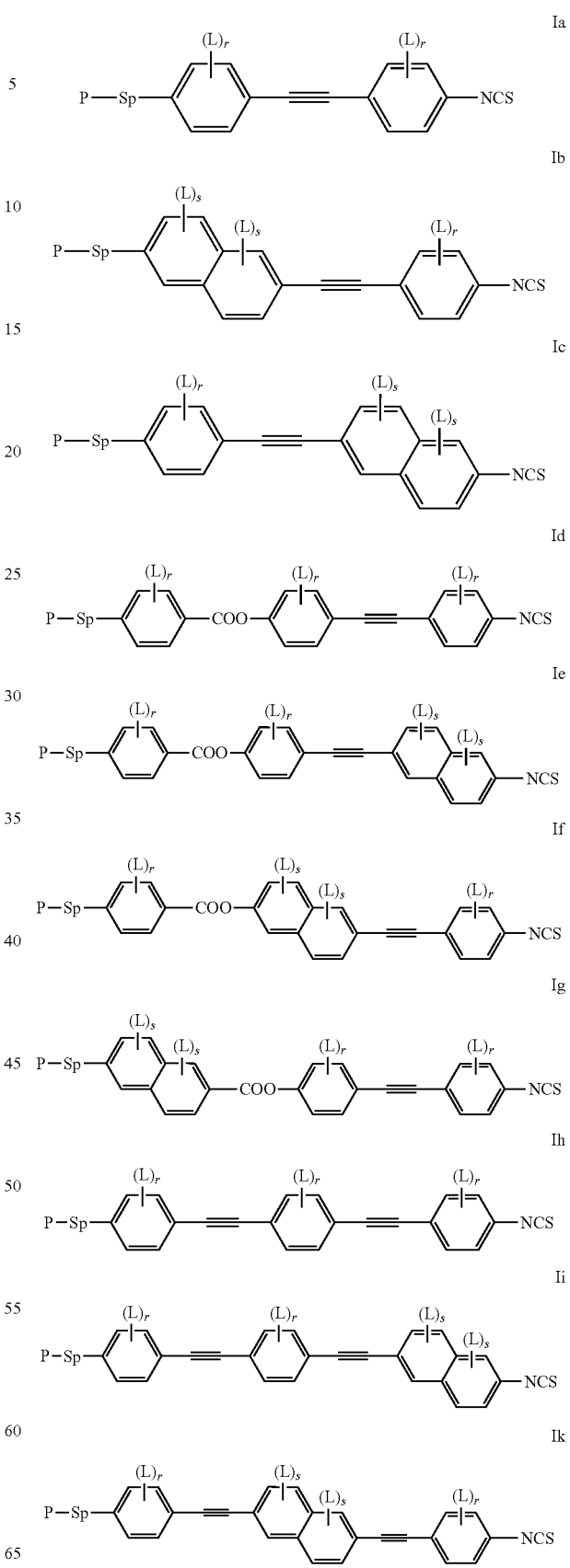

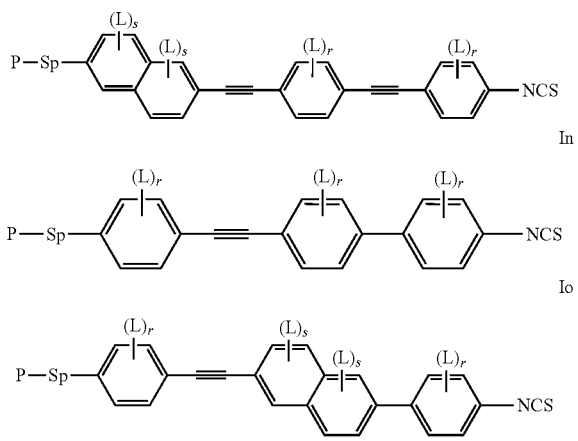

wherein P, Sp and L have the meanings given above, r is 0, 1, 2, 3 or 4, and s is 0, 1, 2 or 3.

The compounds of formula I can be synthesized according to or in analogy to methods which are known per se and which are described in the literature and in standard works of organic chemistry such as, for example, Houben-Weyl, Methoden der organischen Chemie, Thieme-Verlag, Stuttgart. Especially preferably the compounds are prepared according to or in analogy to the method shown in Scheme 1 below.

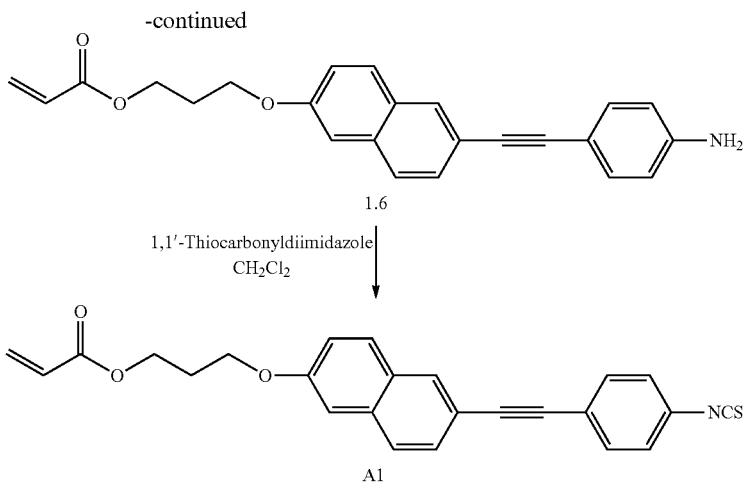

The 2-iodo-6-methoxy-naphthalene (1.1) is prepared by treatment of 2-bromo-6-methoxy-naphthalene (1.1) with BuLi and iodine. Demethylation of this material with BBr$_3$ gives 2-iodo-6-hydroxy-naphthalene (1.3). Reaction of 3-bromopropanol and potassium carbonate in MEK gives the ether (1.4). Reaction of this ether with 3-chloropropionyl chloride and triethylamine gives the ester (1.5). Reaction of this ester with 4-aminophenylacetylene under Sonogashira conditions gives the p-amino tolane (1.6). Treatment of this amino tolane with 1,1'-thiocarbonyl-diamidazole, as described for example in H. A. Staab, G. Walther, Ann. 1962, 657, 104-107, gives the isothiocyanato compound A1.

A preferred method comprises the following steps:

a) etherification of the OH group of a p-halogen substituted, preferably p-brominated or p-iodinated, aromatic alcohol, like for example 6-bromo-2-naphthalenol or 4-bromophenol, with the halogen group of an ω-halogen substituted, preferably ω-chlorinated, aliphatic alcohol, like for example 3-chloropropanol or 6-chlorohexanol, b) reaction of the aliphatic OH group of the ether prepared by step a) with a polymerisable group or a protected version of a polymerisable group, for example by esterification with 3-chloropropionyl chloride, c) reaction of the (aromatic) halogen group of the ester prepared by step c) with a p-amino arylacetylene, for example 4-aminophenylacetylene, under Sonogashira conditions to give a p-amino tolane, d) treatment of the amino group of the tolane prepared in step c) with 1,1'-thiocarbonyldiamidazole to give a p-isothiocyanato tolane, e) optionally conversion of the protected version of the polymerisable group of the isothiocyanato tolane of step d), e.g. by treatment with a base, like for example triethylamine.

Another aspect of the invention is a polymerisable LC material comprising one or more compounds of formula I. Preferably the LC material is a mixture comprising one or more additional RMs, which are preferably selected from mono- and direactive RMs.

Especially preferred is a polymerisable LC mixture comprising

A) one or more compounds of formula I,
B) one or more compounds of formula II $$\text{P-Sp-}(A^1\text{-}Z^1)_{m1}\text{-}A^4\text{-C}\equiv\text{C-}A^5\text{-}(A^1\text{-}Z^1)_{m2}\text{—R} \qquad \text{II}$$

wherein $A^4$ and $A^5$ are independently of each other selected from aromatic or heteroaromatic groups, which are optionally substituted, preferably from 1,4-phenylene or naphthalene-2,6-diyl, wherein one or more CH groups may be replaced by N, and which are optionally substituted by one or more groups L, R is selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein X is halogen, m1 and m2 are independently of each other 0, 1, 2, 3 or 4, with m1+m2<5, and P, Sp, $A^1$, $Z^1$, L, $R^0$ and $R^{00}$ have the meanings given in formula I, C) optionally one or more polymerisable mesogenic compounds having two or more polymerisable groups, which can be selected from the compounds of components A), B) or D) of from additional compounds, D) optionally one or more chiral compounds, which can be selected from the compounds of components A), B) or C) or from additional compounds, E) optionally one or more polymerisation initiators, F) optionally one or more surfactants.

The concentration of the compounds of formula I or component A) in the polymerisable LC material is preferably from 1% to 60%.

The compounds of component B) and formula II are preferably selected from RMs having a high birefringence, very preferably a birefringence Δn>0.2. Especially preferred are compounds of formula II wherein $A^4$ is 1,4-phenylene or naphthalene 2,6-diyl, each being optionally substituted with one or more groups L, $A^5$ is 1,4-phenylene or naphthalene 2,6-diyl, each being optionally substituted with one or more groups L, $A^1$ is 1,4-phenylene or naphthalene 2,6-diyl, each being optionally substituted with one or more groups L, $Z^1$ is —COO—, —OCO—, —C≡C— or a single bond, very preferably —COO— or —C≡C—, m1 is 0,
m1 is 1,
m2 is 0, R is selected from CN, OCH$_3$ and SCH$_3$, R denotes P-Sp- as defined above.

Very preferred compounds of formula II and component B) are selected from the group consisting of the following sub-formulae:

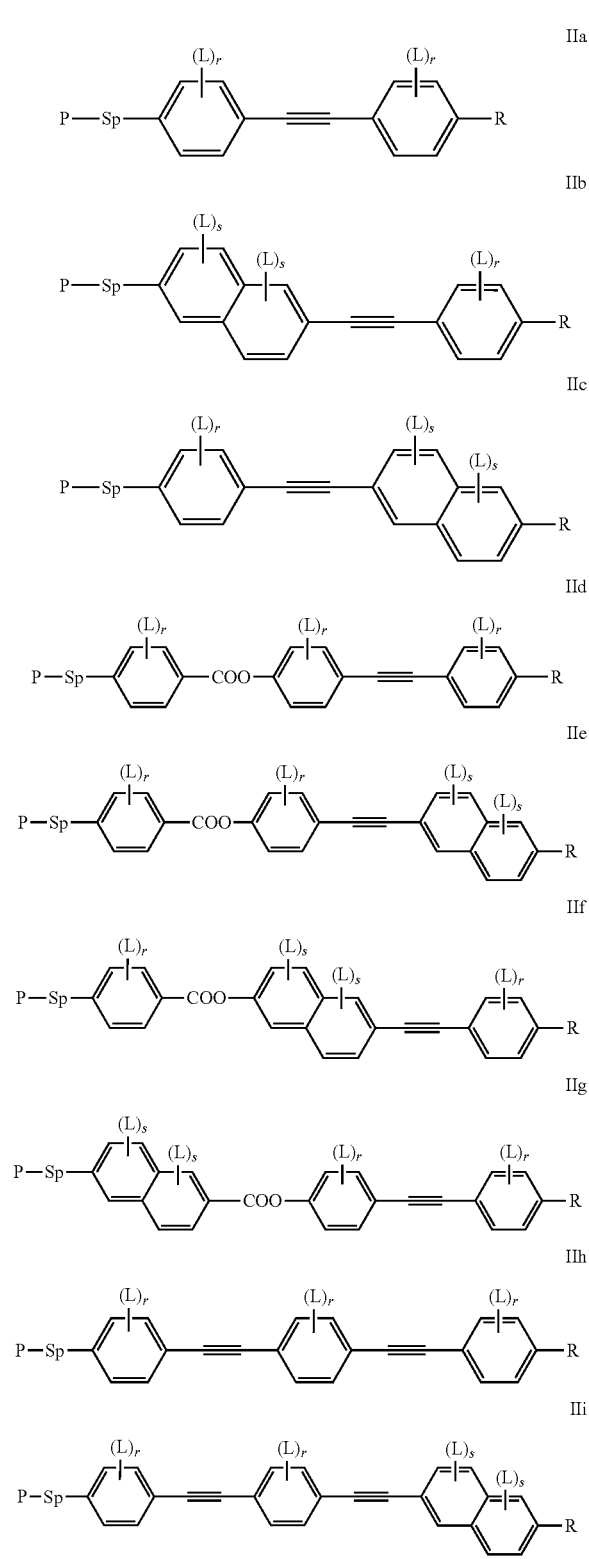

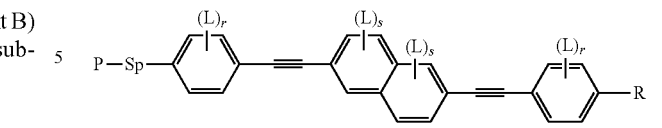

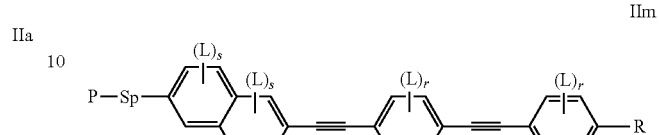

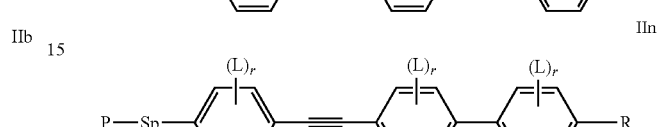

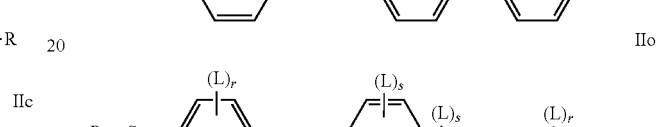

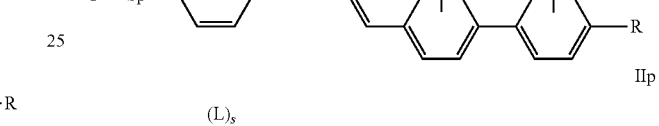

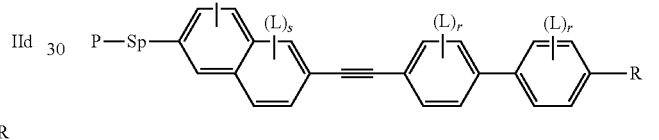

wherein P, Sp, L and R have the meanings given above, r is 0, 1, 2, 3 or 4, and s is 0, 1, 2 or 3, very preferably R denotes P-Sp-, CN, OCH$_3$ or SCH$_3$.

The concentration of the compounds of formula II and/or component B) in the polymerisable LC mixture is preferably from 10% to 70%.

Preferably the mixture comprises one or more compounds of component C) comprising two or more polymerisable groups (di- or multireactive compounds). The compounds of component C) are preferably selected from formula III $$P\text{-}Sp\text{-}MG\text{-}Sp\text{-}P \qquad \text{III}$$

wherein P and Sp have, in case of multiple occurrence independently of one another, the meanings given in formula I and MG is a rod-like mesogenic group that is optionally chiral.

MG is preferably selected of formula IV $$\text{-}(A^{11}\text{-}Z^{11})_m\text{-}A^{22}\text{-} \qquad \text{IV}$$

wherein $A^{11}$ and $A^{22}$ are, in case of multiple occurrence independently of one another, an aromatic or alicyclic group, which optionally contains one or more heteroatoms selected from N, O and S, and is optionally mono- or polysubstituted by L as defined above, $Z^{11}$ in case of multiple occurrence independently of one another denotes —O—, —S—, —CO—, —COO—, —OCO—, —S—CO—, —CO—S—, —O—COO—, —CO—NR$^o$—, —NR$^o$—CO—, —NR$^o$—CO—NR$^{oo}$, —NR$^o$—CO—O—, —O—CO—NR$^o$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^o$—, —CY$^1$=CY$^2$—, —C≡C—, —CH=CH—COO—, —OCO—CH=CH— or a single bond, R$^0$ and R$^{00}$ independently of each other denote H or alkyl with 1 to 12 C-atoms, Y$^1$ and Y$^2$ independently of each other denote H, F, Cl or CN, m is 0, 1, 2, 3 or 4.

Preferred groups A$^{11}$ and A$^{22}$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, naphthalene, tetrahydronaphthalene, anthracene and phenanthrene, all of which are optionally substituted by one or more groups L.

Particular preferred groups A$^{11}$ and A$^{22}$ are selected from 1,4-phenylene, pyridine-2,5-diyl, pyrimidine-2,5-diyl, thiophene-2,5-diyl, naphthalene-2,6-diyl, 1,2,3,4-tetrahydro-naphthalene-2,6-diyl, indane-2,5-diyl, bicyclooctylene or 1,4-cyclohexylene wherein one or two non-adjacent CH$_2$ groups are optionally replaced by O and/or S, wherein these groups are unsubstituted, mono- or polysubstituted by L as defined above.

Especially preferred compounds of formula III are those of formula II, or its preferred subformulae IIa-IIp, wherein R is P-Sp.

Further preferred compounds of formula III and component C) are selected from the group consisting of the following direactive compounds:

alkoxy, alkylcarbonyl, alkoxycarbonyl, alkylcarbonyloxy or alkoxycarbonyloxy with 1 to 5 C atoms, r is 0, 1, 2, 3 or 4, x and y are independently of each other 0 or identical or different integers from 1 to 12, z is 0 or 1, with z being 0 if the adjacent x or y is 0, and wherein the benzene rings can additionally be substituted with one or more identical or different groups L.

The concentration of the compounds of formula III and/or component C) in the polymerisable LC mixture is preferably from 5% to 70%.

The compounds of formula II and III can be synthesized according to or in analogy to methods which are known per se and which are described in the literature and in standard works of organic chemistry such as, for example, Houben-Weyl, Methoden der organischen Chemie, Thieme-Verlag, Stuttgart. Suitable compounds of formula III and methods for their synthesis are also described in U.S. Pat. No. 6,042,745. Suitable compounds of component B and methods for their preparation are described for example in U.S. Pat. No. 6,514,578, US 2008/0143943 A1 and GB 2 388 599 A1.

Component D) may comprise one or more polymerisable or unpolymerisable chiral compounds having one or more chiral groups.

Suitable unpolymerisable chiral compounds are for example standard chiral dopants like R- or S-811, R- or S-1011, R- or S-2011, R- or S-3011, R- or S-4011, R- or S-5011, or CB 15 (all available from Merck KGaA, Darms-

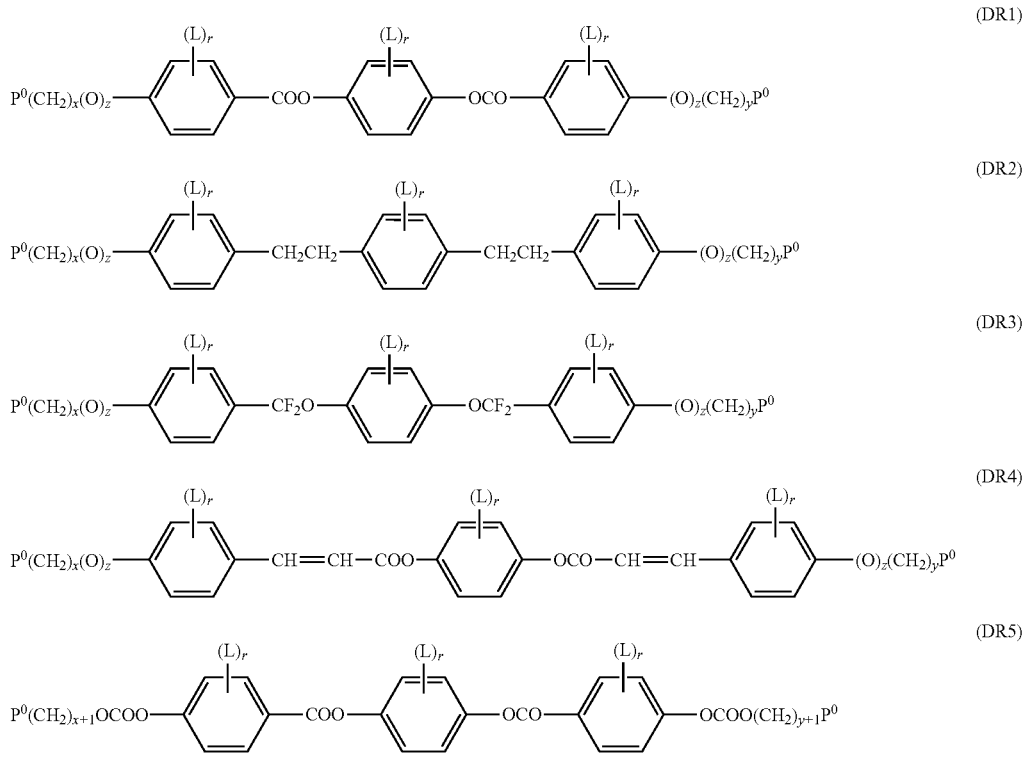

wherein

P$^0$ is, in case of multiple occurrence independently of one another, a polymerisable group, preferably an acryl, methacryl, oxetane, epoxy, vinyl, vinyloxy, propenyl ether or styrene group, L is, in case of multiple occurrence independently of one another, H, F, Cl, CN or optionally halogenated alkyl, tadt, Germany), sorbitols as described in U.S. Pat. No. 6,217,792, hydrobenzoins as described in U.S. Pat. No. 6,511,719, chiral binaphthols as described in U.S. Pat. No. 7,223,450, chiral binaphthol acetals as described in WO 02/34739, chiral TADDOLs as described in U.S. Pat. No. 7,041,345, or chiral compounds having fluorinated linkage groups as described in U.S. Pat. No. 7,060,331 or U.S. Pat. No. 7,318,950. Suitable polymerisable chiral compounds are for example those listed below or the polymerisable chiral material Paliocolor® LC756 (from BASF AG, Ludwigshafen, Germany).
Very preferred polymerisable chiral compounds and compounds of component D) are selected from the group consisting of the following compounds:
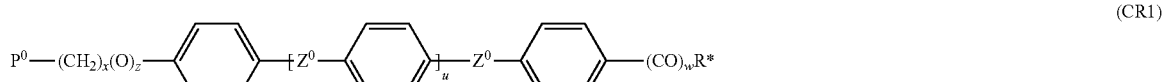
(CR1)
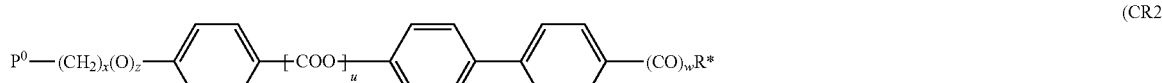
(CR2)
(CR3)
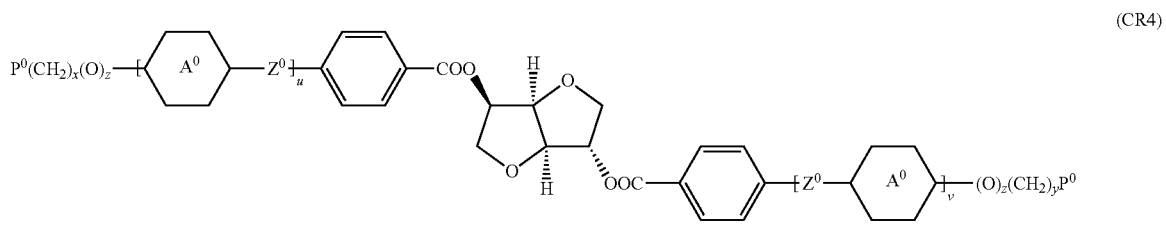
(CR4)
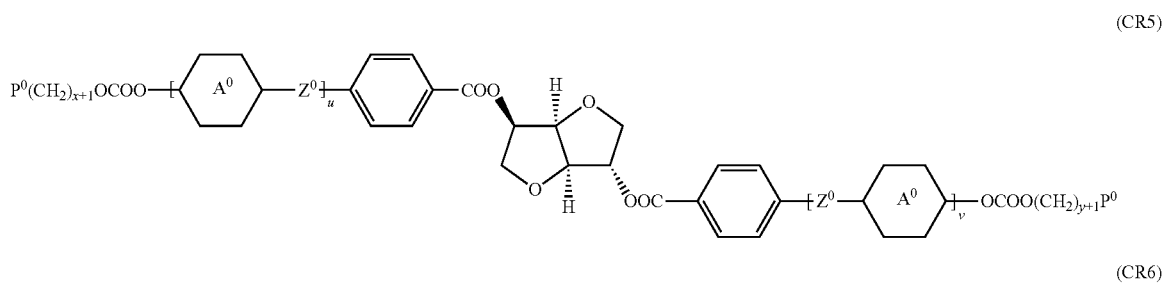
(CR5)
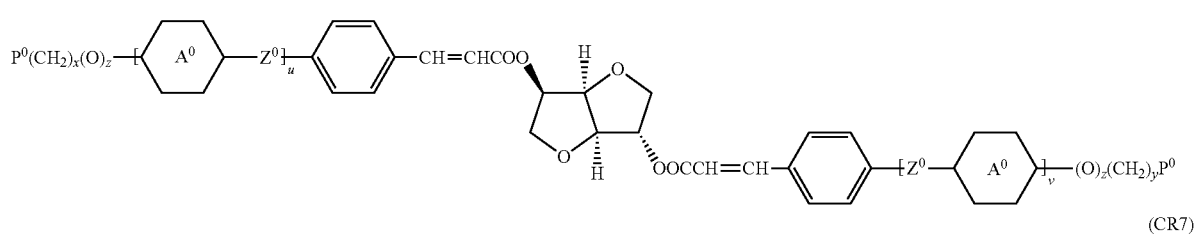
(CR6)
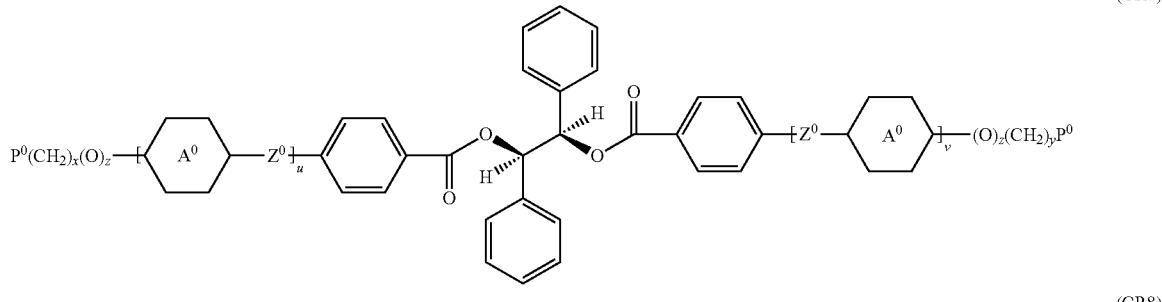
(CR7)
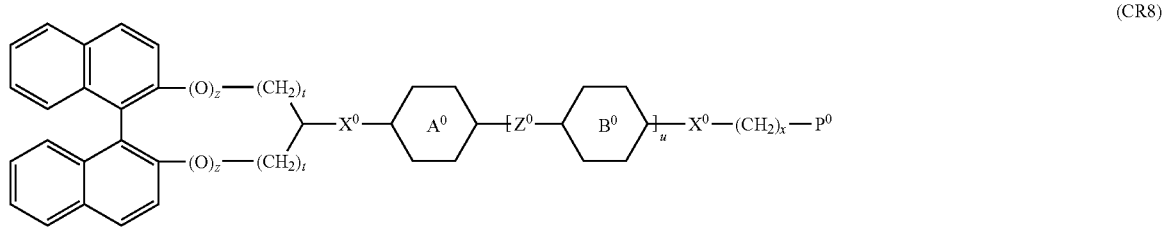
(CR8)

wherein
P⁰ is, in case of multiple occurrence independently of one another, a polymerisable group, preferably an acryl, methacryl, oxetane, epoxy, vinyl, vinyloxy, propenyl ether or styrene group,
A⁰ and B⁰ are, in case of multiple occurrence independently of one another, 1,4-phenylene that is optionally substituted with 1, 2, 3 or 4 groups L, or trans-1,4-cyclohexylene,
X⁰ is, in case of multiple occurrence independently of one another, —O—, —COO—, —OCO—, —O—CO—O— or a single bond,
Z⁰ is, in case of multiple occurrence independently of one another, —COO—, —OCO—, —O—CO—O—, —CH₂CH₂—, —C≡C—, —CH=CH—, —CH=CH—COO—, —OCO—CH=CH— or a single bond,
R* is a chiral alkyl or alkoxy group with 4 or more, preferably 4 to 12 C atoms, like 2-methylbutyl, 2-methyloctyl, 2-methylbutoxy or 2-methyloctoxy,
Ch is a chiral group selected from cholesteryl, estradiol, or terpenoid radicals like menthyl or citronellyl,
L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
t is, in case of multiple occurrence independently of one another, 0, 1, 2 or 3,
u and v are independently of each other 0, 1 or 2,
w is 0 or 1,
x and y are independently of each other 0 or identical or different integers from 1 to 12,
z is 0 or 1, with z being 0 if the adjacent x or y is 0, and wherein the benzene and napthalene rings can additionally be substituted with one or more identical or different groups L.

The concentration of the chiral compounds and/or component D) in the polymerisable LC mixture is preferably from 5 to 25 wt. %.

In addition to the compounds of components A)-D) the LC mixture may comprise one or more further RMs as a component G). These further RMs are preferably calamitic monomers. Very preferably these further RMs of component G) are selected from the following formula:

P-Sp-MG-R    V wherein P, Sp and MG have the meanings given above,
R denotes F, Cl, Br, I, —CN, —NO₂, —NCO, —NCS, —OCN, —SCN, —C(=O)NR⁰R⁰⁰, —C(=O)X, —C(=O)OR⁰, —C(=O)R⁰, —NR⁰R⁰⁰, —OH, —SF₅, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein X is halogen, and
R⁰ and R⁰⁰ are independently of each other H or alkyl with 1 to 12 C-atoms.

The additional RMs of the polymerisable LC mixture can be prepared by methods which are known per se and which are described in standard works of organic chemistry like for example Houben-Weyl, Methoden der organischen Chemie, Thieme-Verlag, Stuttgart. Suitable RMs are disclosed for example in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107 and U.S. Pat. No. 6,514,578. Examples of particularly suitable and preferred RMs are shown in the following list.

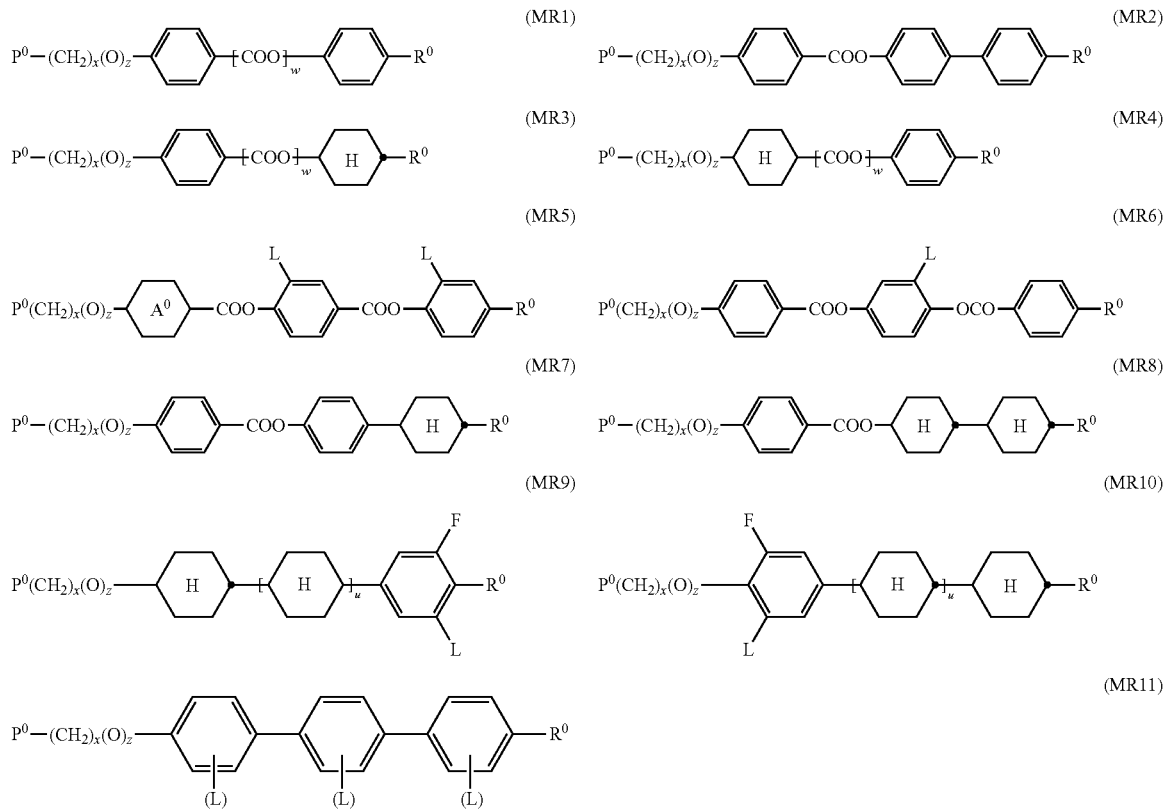

-continued

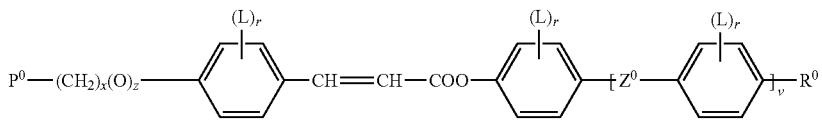
(MR12)

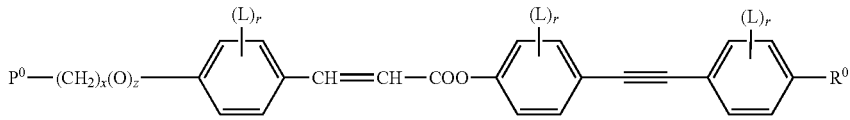
(MR13)

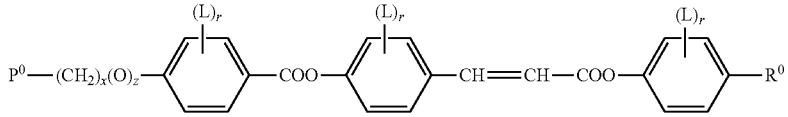
(MR14)

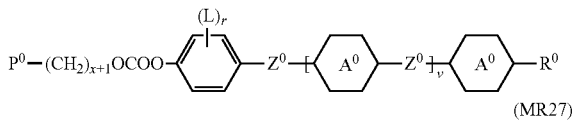
(MR15)

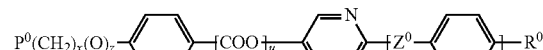
(MR16)

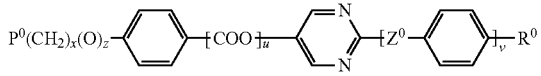
(MR27)

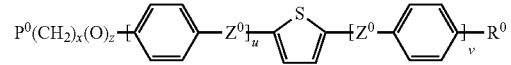
(MR17)

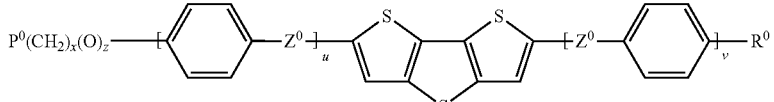
(MR18)

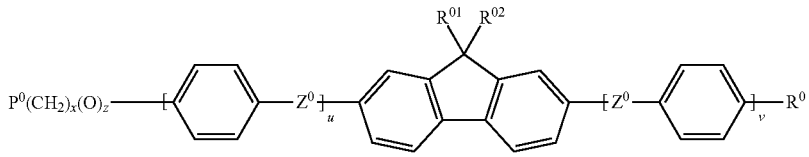
(MR19)

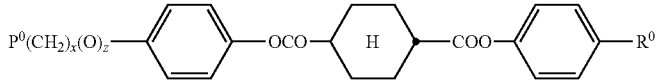
(MR20)

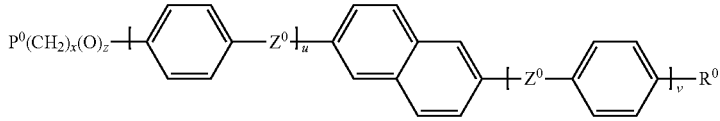
(MR21)

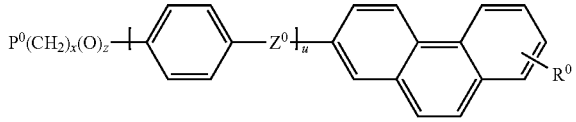
(MR22)

(MR23)

wherein $P^0$ is, in case of multiple occurrence independently of one another, a polymerisable group, preferably an acryl, methacryl, oxetane, epoxy, vinyl, vinyloxy, propenyl ether or styrene group, $Z^0$ is, in case of multiple occurrence independently of one another, —COO—, —OCO—, —CH$_2$CH$_2$—, —C≡C—, —CH=CH—, —CH=CH—COO—, —OCO—CH=CH— or a single bond, $R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is $Y^0$ or P—(CH$_2$)$_y$—(O)$_z$—, $Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, $R^{01,02}$ are independently of each other H, $R^0$ or $Y^0$, L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4,
u and v are independently of each other 0, 1 or 2,
w is 0 or 1,
x and y are independently of each other 0 or identical or different integers from 1 to 12,
z is 0 or 1, with z being 0 if the adjacent x or y is 0,
and wherein the benzene rings can additionally be substituted with one or more identical or different groups L.

The concentration of the additional RMs of formula V and/or component G) in the polymerisable LC mixture is preferably from 5 to 50 wt. %.

Polymerisation of the polymerisable LC material is preferably carried out in the presence of an initiator absorbing at the wavelength of the actinic radiation. For this purpose the polymerisable LC material preferably comprises one or more initiators of component E). For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure® or Darocure® (Ciba AG), like for example Irgacure 651, Irgacure 907 or Irgacure 369. A typical cationic photoinitiator is for example UVI 6974 (Union Carbide).

Preferably component E) comprises a dichroic or liquid crystalline photoinitiator as disclosed for example in EP 1 388 538 A1. Very preferred dichroic photoinitiators of component E) are selected from the group consisting of the following formulae:

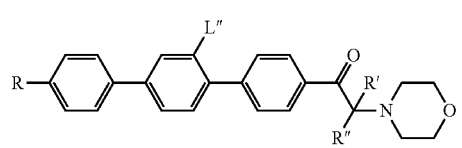
PI1

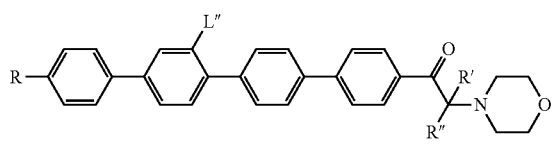
PI2

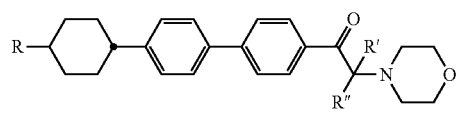
PI3

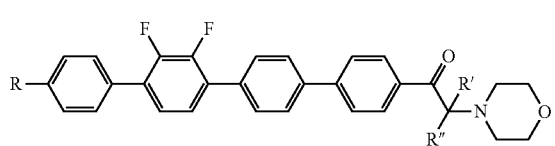
PI4

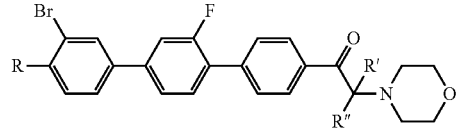
PI5

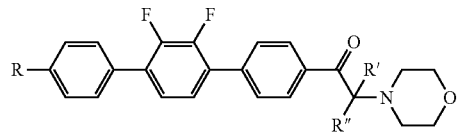
PI6

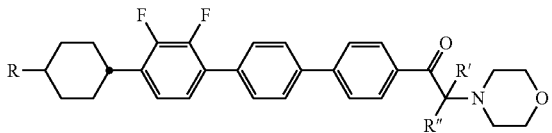
PI7

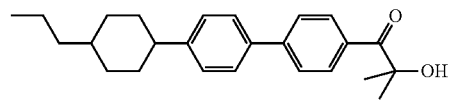
PI8 wherein L" is H or F, R is alkyl or alkoxy with 1 to 12 C-atoms, and R' and R" are selected from alkyl or alkoxy with 1 to 6 C-atoms, very preferably from methyl, ethyl or propyl.

The concentration of the polymerisation initiator or component E) in the polymerisable LC mixture is preferably from 0.01 to 10%, very preferably from 0.05 to 6 wt. %.

Further preferred is a polymerisable material comprising one or more surfactants of component F), which promote a specific surface alignment of the LC molecules. Suitable surfactants are described for example in J. Cognard, Mol. Crystliq. Cryst. 78, Supplement 1, 1-77 (1981). Preferred aligning agents for planar alignment are for example non-ionic surfactants, preferably fluorocarbon surfactants such as the commercially available Fluorad FC-171® (from 3M Co.) or Zonyl FSN® (from DuPont), multiblock surfactants as described in GB 2 383 040 or polymerisable surfactants as described in EP 1 256 617 A1.

The concentration of surfactants or component F) in the polymerisable LC mixture is preferably from 0.1 to 1.5 wt. %.

In the formulae above and below, the aromatic and heteroaromatic groups like $A^{1-5}$ and $A^{11,22}$ may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 40 C atoms, in case of aromatic groups preferably with 6 to 40 C atoms, most preferably 6 to 20 C atoms, in case of heteroaromatic groups preferably with 2 to 40 C atoms, most preferably with 2 to 20 C atoms, all of which do optionally comprise fused rings and are optionally substituted.

Preferred aromatic groups include, without limitation, benzene, biphenylene, triphenylene, [1,1':3',1"]terphenyl-2'-ylene, naphthalene, anthracene, binaphthylene, phenanthrene, pyrene, dihydropyrene, chrysene, perylene, tetracene, pentacene, benzpyrene, fluorene, indene, indenofluorene, spirobifluorene, etc.

Preferred heteroaromatic groups include, without limitation, 5-membered rings like pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings like pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, and fused systems like carbazole, indole, isoindole, indolizine, indazole, benzimidazole, benzotriazole, purine, naphthimidazole, phenanthrimidazole, pyridimidazole, pyrazinimidazole, quinoxalinimidazole, benzaxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dithienopyridine, isobenzothiophene, dibenzothiophene, benzothiadiazothiophene, or combinations thereof.

The non-aromatic carbocyclic and heterocyclic groups like $A^1$ and $A^{11,22}$ include rings which are fully saturated, i.e. formed only single bonds, and rings which are partially saturated, i.e. they may also comprise double bonds. The non-aromatic rings may also comprise one or more hetero atoms, preferably selected from Si, O, N and S.

The carbocyclic and heterocyclic (non-aromatic) groups like $A^1$ and $A^{11,22}$ may be mononuclear, i.e. having only one ring (like for example cyclohexane), or polynuclear, i.e. having two or more fused rings (like for example decahydronaphthalene or bicyclooctane). Especially preferred are fully saturated groups. Further preferred are mono-, bi- or tricyclic groups with up to 40 C atoms, in case of carbocyclic groups preferably with 6 to 40 C atoms, most preferably 6 to 20 C atoms, in case of heterocyclic groups preferably with 2 to 40 C atoms, most preferably with 2 to 20 C atoms, all of which do optionally comprise fused rings and are optionally substituted. Very preferred are 5-, 6-, 7- or 8-membered carbocyclic rings wherein one or more C-atoms are optionally replaced by Si and/or one or more CH groups are optionally replaced by N and/or one or more non-adjacent $CH_2$ groups are optionally replaced by —O— and/or —S—, all of which are optionally substituted.

Preferred carbocyclic and heterocyclic groups include, without limitation, 5-membered rings like cyclopentane, tetrahydrofuran, tetrahydrothiofuran, pyrrolidine, 6-membered rings like cyclohexane, silinane, cyclohexene, tetrahydropyran, tetrahydrothiopyran, 1,3-dioxane, 1,3-dithiane, piperidine, 7-membered rings like cycloheptane, and fused systems like tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methano-indan-2,5-diyl, or combinations thereof.

The groups $A^1$ and $A^{11,22}$ are preferably selected from trans-1,4-cyclohexylene, 1,4-phenylene and naphthalene-2,6-diyl, which are optionally substituted with one or more groups L.

The groups $A^2$, $A^3$, $A^4$ and $A^5$ are preferably independently of each other selected from 1,4-phenylene and naphthalene-2,6-diyl, which are optionally substituted with one or more groups L.

The groups $Z^1$ and $Z^{11}$ are preferably selected from —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_3$—, —$(CH_2)_4$—, —$CF_2CH_2$—, —$CH_2CF_2$—, —$CF_2CF_2$—, —CH=CH—, —$CY^1$=$CY^2$—, —CH=N—, —N=CH—, —N=N—, —CH=$CR^0$—, —C≡C—, —CH=CH—COO—, —OCO—CH=CH—, $CR^0R^{00}$ or a single bond, very preferably from —COO—, —OCO— and a single bond.

The substituents on the rings, like L in formula I, are preferably selected from P-Sp-, F, Cl, Br, I, —CN, —$NO_2$, —NCO, —NCS, —OCN, —SCN, —C(=O)$NR^0R^{00}$, —C(=O)X, —C(=O)$OR^0$, —C(=O)$R^0$, —$NR^0R^{00}$, —OH, —$SF_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein $R^0$ and $R^{00}$ are as defined in formula I and X is halogen.

Preferred substituents are selected from F, Cl, CN, $NO_2$ or straight chain or branched alkyl, alkoxy, alkylcarbonyl, alkoxycarbonyl, alkylcarbonyloxy or alkoxycarbonyloxy with 1 to 12 C atoms, wherein the alkyl groups are optionally perfluorinated, or P-Sp-.

Very preferred substituents are selected from F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, in particular F, Cl, CN, $CH_3$, $C_2H_5$, $C(CH_3)_3$, $CH(CH_3)_2$, $OCH_3$, $COCH_3$ or $OCF_3$, most preferably F, Cl, $CH_3$, $C(CH_3)_3$, $OCH_3$ or $COCH_3$, or P-Sp-.

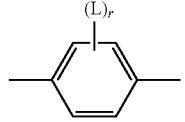

is preferably

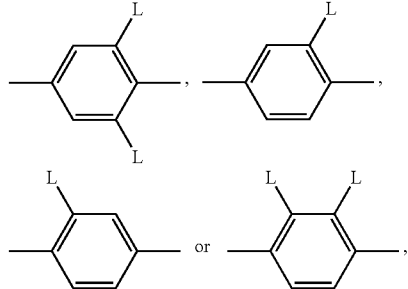

with L having each independently one of the meanings given above.

An alkyl or alkoxy radical, i.e. where the terminal $CH_2$ group is replaced by —O—, can be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkyl group wherein one or more $CH_2$ groups are replaced by —CH=CH— can be straight-chain or branched.

It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one $CH_2$ group is replaced by —O— and one by —CO—, these radicals are preferably neighboured. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl)ethyl, 2-(ethoxycarbonyl)ethyl, 2-(propoxy-carbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen is preferably straight-chain. Halogen is preferably F or Cl, in case of multiple substitution preferably F. The resulting groups include also perfluorinated groups. In case of monosubstitution the F or Cl substituent can be in any desired position, but is preferably in ω-position. Examples for especially preferred straight-chain groups with a terminal F substituent are fluoromethyl, 2-fluorethyl, 3-fluorpropyl, 4-fluorbutyl, 5-fluorpentyl, 6-fluorhexyl and 7-fluorheptyl. Other positions of F are, however, not excluded.

$R^0$ and $R^{00}$ are preferably selected from H, straight-chain or branched alkyl with 1 to 12 C atoms.

—$CY^1$=$CY^2$— is preferably —CH=CH—, —CF=CF— or —CH=C(CN)—.

Halogen is F, Cl, Br or I, preferably F or Cl.

The polymerisable group P is a group that is capable of participating in a polymerisation reaction, like radical or ionic chain polymerisation, polyaddition or polycondensation, or capable of being grafted, for example by condensation or addition, to a polymer backbone in a polymer analogous reaction. Especially preferred are polymerisable groups for chain polymerisation reactions, like radical, cationic or anionic polymerisation. Very preferred are polymerisable groups comprising a C—C double or triple bond, and polymerisable groups capable of polymerisation by a ring-opening reaction, like oxetanes or epoxides.

Suitable and preferred polymerisable groups include, without limitation, $CH_2$=$CW^1$—COO—, $CH_2$=$CW^1$—CO—,

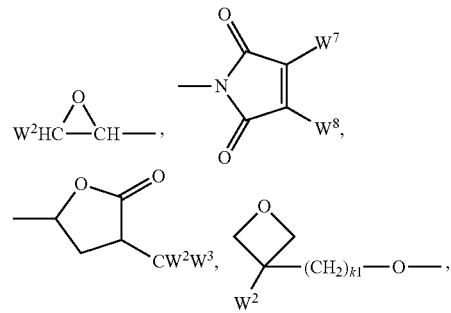

$CH_2$=$CW^2$—(O)$_{k1}$—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, H$W^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN—, and $W^4W^5W^6Si$—, with $W^1$ being H, F, Cl, CN, $CF_3$, phenyl or alkyl with 1 to 5 C-atoms, in particular H, Cl or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted, preferably by one or more groups L as defined above (except for the meaning P-Sp-), and $k_1$ and $k_2$ being independently of each other 0 or 1.

Very preferred polymerisable groups are selected from $CH_2$=$CW^1$—COO—, $CH_2$=$CW^1$—CO—,

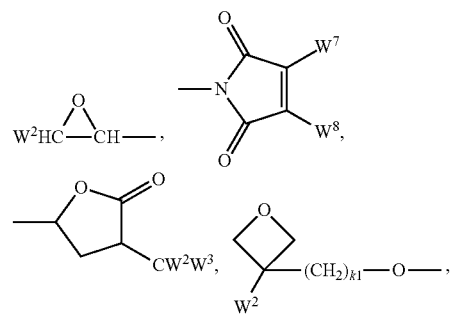

($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—,

HS—CW²W³—, HW²N—, HO—CW²W³—NH—, CH₂=CW¹—CO—NH—, CH₂=CH—(COO)$_{k1}$-Phe-(O)$_{k2}$—, CH₂=CH—(CO)$_{k1}$-Phe-(O)$_{k2}$—, Phe-CH=CH—, HOOC—, OCN—, and W⁴W⁵W⁶Si—, with W¹ being H, F, Cl, CN, CF₃, phenyl or alkyl with 1 to 5 C-atoms, in particular H, Cl or CH₃, W² and W³ being independently of each other H or alkyl with 1 to 5 C-atoms, in particular H, oxaalkyl or oxacarbonylalkyl with 1 to 5 C-atoms, W⁷ and W⁸ being independently of each other H, Cl or alkyl with 1 to 5 C-atoms, Phe being 1,4-phenylene that is optionally substituted preferably by one or more groups L as defined above (except for the meaning P-Sp-), and k₁ and k₂ being independently of each other 0 or 1.

Most preferred polymerisable groups are selected from CH₂=CH—COO—, CH₂=C(CH₃)—COO—, (CH₂=CH)₂CH—OCO—, (CH₂=CH)₂CH—O—,

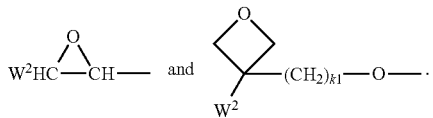

Polymerisation can be carried out according to methods that are known to the ordinary expert and described in the literature; for example in D. J. Broer; G. Challa; G. N. Mol, *Macromol. Chem.*, 1991, 192, 59.

The spacer group Sp is preferably selected of formula Sp'-X', such that P-Sp- is P-Sp'-X'-, wherein Sp' is straight-chain, branched or cyclic alkylene with 1 to 20 C atoms, preferably 1 to 12 C-atoms, which is optionally mono- or polysubstituted by F, Cl, Br, I or CN, and wherein one or more non-adjacent CH₂ groups are optionally replaced, in each case independently from one another, by —O—, —S—, —NH—, —NR⁰—, —SiR⁰R⁰⁰—, —CO—, —COO—, —OCO—, —OCO—O—, —S—CO—, —CO—S—, —NR⁰—CO—O—, —O—CO—NR⁰—, —NR⁰—CO—NR⁰—, —CH=CH— or —C≡C— in such a manner that O and/or S atoms are not linked directly to one another, X' is selected from —O—, —S—, —CO—, —COO—, —OCO—, —O—COO—, —CO—NR⁰—, —NR⁰—CO—, —NR⁰—CO—NR⁰—, —OCH₂—, —CH₂O—, —SCH₂—, —CH₂S—, —CF₂O—, —OCF₂—, —CF₂S—, —SCF₂—, —CF₂CH₂—, —CH₂CF₂—, —CF₂CF₂—, —CH=N—, —N=CH—, —N=N—, —CH=CR⁰—, —CY¹=CY²—, —C≡C—, —CH=CH—COO—, —OCO—CH=CH— or a single bond, R⁰ and R⁰⁰ are independently of each other H or alkyl with 1 to 12 C-atoms, and Y¹ and Y² are independently of each other H, F, Cl or CN.

X' is preferably —O—, —S—CO—, —COO—, —OCO—, —O—COO—, —CO—NR⁰—, —NR⁰—CO—, —NR⁰—CO—NR⁰— or a single bond.

Typical groups Sp' are, for example, —(CH₂)$_{p1}$—, —(CH₂CH₂O)$_{q1}$—CH₂CH₂—, —CH₂CH₂—S—CH₂CH₂— or —CH₂CH₂—NH—CH₂CH₂— or —(SiR⁰R⁰⁰—O)$_{p1}$—, with p1 being an integer from 1 to 20, preferably 2 to 12, q1 being an integer from 1 to 10, preferably 1 to 5, and R⁰ and R⁰⁰ having the meanings given above.

Preferred groups Sp' are ethylene, propylene, butylene, pentylene, hexylene, heptylene, octylene, nonylene, decylene, undecylene, dodecylene, octadecylene, cyclohexylene, ethyleneoxyethylene, methyleneoxy-butylene, ethylene-thioethylene, ethylene-N-methyl-iminoethylene, 1-methylalkylene, ethenylene, propenylene and butenylene for example. Further preferred are chiral spacer groups, and spacer groups comprising a cycloalkyl group, preferably a cyclohexane group, e.g. 1-alkyl-4-alkyl'-cyclohexane, wherein alkyl and alkyl' are identical or different $C_{1-12}$ alkyl groups.

Further preferred are compounds wherein the polymerisable group P is directly attached to the mesogenic group without a spacer group Sp.

In case of compounds with two or more groups P-Sp-, the polymerisable groups P and the spacer groups Sp can be identical or different.

In another preferred embodiment the compounds of formula I, II, III, IV and/or V comprise one or more polymerisable groups P, or one or more substituents L, that comprises two or more polymerisable subgroups P$^x$ or P$^x$-Sp- (multifunctional polymerisable groups). Suitable multifunctional polymerisable groups of this type are disclosed for example in U.S. Pat. No. 7,060,200 B1 oder US 2006/0172090 A1. Very preferred are compounds comprising one or more multifunctional polymerisable groups P selected from the group consisting of the following formulae:

| | |
|---|---|
| —X-alkyl-CHP¹—CH₂—CH₂P² | P1 |
| —X-alkyl-C(CH₂P¹)(CH₂P²)—CH₂P³ | P2 |
| —X-alkyl-CHP¹CHP²—CH₂P³ | P3 |
| —X'-alkyl-C(CH₂P¹)(CH₂P²)—C$_{aa}$H$_{2aa+1}$ | P4 |
| —X'-alkyl-CHP¹—CH₂P² | P5 |
| —X'-alkyl-CHP¹P² | P5 |
| —X-alkyl-CP¹P²—C$_{aa}$H$_{2aa+1}$ | P6 |
| —X'-alkyl-C(CH₂P¹)(CH₂P²)—CH₂OCH₂—C(CH₂P³)(CH₂P⁴)CH₂P⁵ | P7 |
| —X'-alkyl-CH((CH₂)$_{aa}$P¹)((CH₂)$_{bb}$P²) | P8 |
| —X'-alkyl-CHP¹CHP²—C$_{aa}$H$_{2aa+1}$ | P9 | wherein alkyl is straight-chain or branched alkylene having 1 to 12 C-atoms which is unsubstituted, mono- or polysubstituted by F, Cl, Br, I or CN, and wherein one or more non-adjacent CH₂ groups are optionally replaced, in each case independently from one another, by —O—, —S—, —NH—, —NR⁰—, —SiR⁰R⁰⁰—, —CO—, —COO—, —OCO—, —O—CO—O—, —S—CO—, —CO—S—, —SO₂—, —CO—NR⁰—, —NR⁰—CO—, —NR⁰—CO—NR⁰⁰—, —CY¹=CY²— or —C≡C— in such a manner that O and/or S atoms are not linked directly to one another, with Y¹, Y², R⁰ and R⁰⁰ having the meanings given above, or denotes a single bond, aa and bb are independently of each other 0, 1, 2, 3, 4, 5 or 6, X' is as defined above, and P¹⁻⁵ independently of each other have one of the meanings given for P above.

The general preparation of polymer films according to this invention is known to the ordinary expert and described in the literature, for example in D. J. Broer; G. Challa; G. N. Mol, *Macromol. Chem.*, 1991, 192, 59. Typically a polymerisable LC material (i.e. a compound or a mixture or formulation) is coated or otherwise applied onto a substrate where it aligns into uniform orientation, and polymerised in situ in its LC phase at a selected temperature for example by exposure to heat or actinic radiation, preferably by photo-polymerisation, very preferably by UV-photopolymerisation, to fix the alignment of the LC molecules. If necessary, uniform alignment can promoted by additional means like shearing or annealing the LC material, surface treatment of the substrate, or adding surfactants to the LC material.

As substrate for example glass or quartz sheets or plastic films can be used. It is also possible to put a second substrate on top of the coated material prior to and/or during and/or after polymerisation. The substrates can be removed after polymerisation or not. When using two substrates in case of curing by actinic radiation, at least one substrate has to be transmissive for the actinic radiation used for the polymerisation. Isotropic or birefringent substrates can be used. In case the substrate is not removed from the polymerised film after polymerisation, preferably isotropic substrates are used.

Suitable and preferred plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®.

The polymerisable material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerisable material in a suitable solvent. This solution is then coated or printed onto the substrate, for example by spin-coating or printing or other known techniques, and the solvent is evaporated off before polymerisation. In many cases it is suitable to heat the mixture in order to facilitate the evaporation of the solvent. As solvents for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), γ-butyrolactone, and the like. It is also possible to use binary, ternary or higher mixtures of the above solvents.

Initial alignment (e.g. planar alignment) of the polymerisable LC material can be achieved for example by rubbing treatment of the substrate, by shearing the material during or after coating, by annealing the material before polymerisation, by application of an alignment layer, by applying a magnetic or electric field to the coated material, or by the addition of surface-active compounds to the material. Reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

It is also possible to apply an alignment layer onto the substrate and provide the polymerisable material onto this alignment layer. Suitable alignment layers are known in the art, like for example rubbed polyimide or alignment layers prepared by photoalignment as described in U.S. Pat. No. 5,602,661, U.S. Pat. No. 5,389,698 or U.S. Pat. No. 6,717,644.

It is also possible to induce or improve alignment by annealing the polymerisable LC material at elevated temperature, preferably at its polymerisation temperature, prior to polymerisation.

Polymerisation is achieved for example by exposing the polymerisable material to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation. As a source for actinic radiation for example a single UV lamp or a set of UV lamps can be used. When using a high lamp power the curing time can be reduced. Another possible source for actinic radiation is a laser, like for example a UV, IR or visible laser.

The polymerisable material may also comprise one or more stabilizers or inhibitors to prevent undesired spontaneous polymerisation, like for example the commercially available Irganox® (Ciba Geigy AG, Basel, Switzerland).

The curing time depends, inter alia, on the reactivity of the polymerisable material, the thickness of the coated layer, the type of polymerisation initiator and the power of the UV lamp. The curing time is preferably $\leq$5 minutes, very preferably $\leq$3 minutes, most preferably $\leq$1 minute. For mass production short curing times of $\leq$30 seconds are preferred.

Preferably polymerisation is carried out in an inert gas atmosphere like nitrogen or argon.

The polymerisable material may also comprise one or more dyes having an absorption maximum adjusted to the wavelength of the radiation used for polymerisation, in particular UV dyes like e.g. 4,4"-azoxy anisole or Tinuvin® dyes (from Ciba AG, Basel, Switzerland).

In another preferred embodiment the polymerisable material comprises one or more monoreactive polymerisable non-mesogenic compounds, preferably in an amount of 0 to 50%, very preferably 0 to 20%. Typical examples are alkylacrylates or alkylmethacrylates.

In another preferred embodiment the polymerisable material comprises one or more di- or multireactive polymerisable non-mesogenic compounds, preferably in an amount of 0 to 50%, very preferably 0 to 20%, alternatively or in addition to the di- or multireactive polymerisable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are trimethylpropanetrimethacrylate or pentaerythritoltetraacrylate.

It is also possible to add one or more chain transfer agents to the polymerisable material in order to modify the physical properties of the polymer film. Especially preferred are thiol compounds, for example monofunctional thiols like dodecane thiol or multifunctional thiols like trimethylpropane tri (3-mercaptopropionate). Very preferred are mesogenic or LC thiols as disclosed for example in U.S. Pat. No. 5,948,486, U.S. Pat. No. 6,096,241, U.S. Pat. No. 6,319,963 or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerisable material may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerisable material does not contain a binder or dispersion auxiliary.

The polymerisable material can additionally comprise one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles.

The thickness of a polymer film according to the present invention is preferably from 0.3 to 5 microns, very preferably from 0.5 to 3 microns, most preferably from 0.7 to 1.5 microns. For use as alignment layer, thin films with a thickness of 0.05 to 1, preferably 0.1 to 0.4 microns are preferred.

A polymer film of the present invention can be used as retardation or compensation film for example in LCDs to improve the contrast and brightness at large viewing angles and reduce the chromaticity. It can be used outside the switchable LC cell of the LCD or between the substrates, usually glass substrates, forming the switchable LC cell and containing the switchable LC medium (incell application).

The polymer film of the present invention can also be used as alignment layer for LC materials. For example, it can be used in an LCD to induce or improve alignment of the switchable LC medium, or to align a subsequent layer of polymerisable LC material coated thereon. In this way, stacks of polymerised LC films can be prepared.

The layers, films and materials of the present invention can be used for various types of optical films, preferably selected from optically uniaxial films (A-plate, C-plate, negative C-plate, O-plate), twisted optical retarders, like for example twisted quarter wave foils (QWF), achromatic retarders, achromatic QWFs or half wave foils (HWF), and optically biaxial films, for example biaxial negative C films. The LC phase structure in the layers and materials can be selected from cholesteric, smectic, nematic and blue phases. The alignment of the LC material in the layer can be selected from homeotropic, splayed, tilted, planar and blue-phase alignment. The layers can be uniformly oriented or exhibit a pattern of different orientations.

The films can be used as optical compensation film for viewing angle enhancement of LCD's or as a component in a brightness enhancement films, furthermore as an achromatic element in reflective or transflective LCD's. Further preferred applications and devices include retarding components in optoelectronic devices requiring similar phase shift at multiple wavelengths, such as combined CD/DVD/HD-DVD/Blu-Ray, including reading, writing re-writing data storage systems achromatic retarders for optical devices such as cameras achromatic retarders for displays including OLED and LCD's.

The polymer film of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned) or PVA (patterned vertically aligned) mode; displays with bend or hybrid alignment like the OCB (optically compensated bend cell or optically compensated birefringence), R-OCB (reflective OCB), HAN (hybrid aligned nematic) or pi-cell (π-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

In addition to the applications mentioned above, the compounds of formula I can also be used in LC mixtures for other LCDs exhibiting a twisted structure like, for example, twisted or supertwisted nematic (TN, STN) displays with multiplex or active matrix addressing, or in cholesteric displays like surface stabilized or polymer stabilized cholesteric texture displays (SSCT, PSCT) as described in WO 92/19695, WO 93/23496, U.S. Pat. No. 5,453,863 or U.S. Pat. No. 5,493,430, for LCDs with variable pitch, like multi-domain LCDs as described in WO 98/57223, or multicolour cholesteric displays as described in U.S. Pat. No. 5,668,614. They can also be used in flexoelectric displays as described for example in GB 2 356 629.

Another preferred use of the compounds of formula I is the preparation of polymerisable LC mixtures, anisotropic polymer gels and anisotropic polymer films. If the compounds of formula I are used in a mixture comprising chiral compounds, or if the compounds of formula I themselves are chiral, polymer films can be prepared that exhibit a helically twisted molecular structure with uniform planar orientation, i.e. wherein the helical axis is oriented perpendicular to the plane of the film, like oriented cholesteric films. Anisotropic polymer gels and displays comprising them are disclosed for example in DE 195 04 224 and GB 2 279 659. Oriented cholesteric polymer films can be used for example as broadband reflective polarisers, colour filters, security markings, or for the preparation of LC pigments.

The inventive compounds of formula I are also suitable for use in thermochromic or photochromic LC media, which change their colour upon temperature change or photoirradiation, respectively.

The following examples are intended to explain the invention without restricting it. The methods, structures and properties described hereinafter can also be applied or transferred to materials that are claimed in this invention but not explicitly described in the foregoing specification or in the examples.

Above and below, percentages are percent by weight. All temperatures are given in degrees Celsius. m.p. denotes melting point; cl.p. denotes clearing point, $T_g$ denotes glass transition temperature. Furthermore, C=crystalline state, N=nematic phase, Ch=cholesteric phase, S=smectic phase and I=isotropic phase. The data between these symbols represent the transition temperatures in ° C. Δn denotes the optical anisotropy ($\Delta n = n_e - n_o$, where $n_o$ denotes the refractive index parallel to the longitudinal molecular axes and $n_e$ denotes the refractive index perpendicular thereto), measured at 589 nm and 20° C. The optical properties are measured at 20° C., unless expressly stated otherwise.

Unless stated otherwise, the percentages of components in a polymerisable mixture as given above and below refer to the total amount of solids in the polymerisable mixture, i.e. not including the solvents.

The retardation profile (retardation vs. angle) of the polymer films is measured as follows: A sample of the film is placed on an M2000V Spectroscopic Ellipsometer and measured in transmission using a light source powered using M-2000V all of which are available from J. A. Woollam Co. Inc. The retardation of the film was generally measured from −40° to +40.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements", in accordance with the measurement procedures described in "Retardation Measurement (RetMeas) Manual (2002)" and "Guide to WVASE (2002)" (Woollam Variable Angle Spectroscopic Ellipsometer) published by J. A. Woollam Co. Inc (Lincoln, Nebr., USA).

Example 1

Compound (A1) is prepared as follows

Preparation of 2-iodo-6-methoxy-naphthalene 1.2

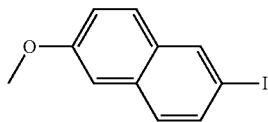
(1.2)

n-Butyllithium (2.5 M in hexanes, 92 mL, 230 mmol) is added via dropping funnel to a solution of 2-bromo-6-methoxy-naphthalene (49.5 g, 209 mmol) in anhydrous THF (2 L) at −75° C. at such a rate that the temperature is kept below −70° C. (over 45 min). The resulting yellow solution is stirred for 15 min at −75° C. A solution of iodine (58.3 g, 230 mmol) in anhydrous THF (100 mL) is added via a fresh dropping funnel until the red iodine colour persists (addition over 45 min, max. temp. −68° C.). The mixture is warmed to rt. and water (1.3 L) is added. The mixture is extracted with dichloromethane (2 L) with brine (500 mL) being added to aid the separation. The aqueous fraction is back-extracted with dichloromethane (1 L). The combined organic fractions are reduced in vacuo to approx. 1 L, washed with saturated aqueous sodium metabisulphite (100 mL), then brine (200 mL), dried ($Na_2SO_4$), filtered and solvent removed in vacuo. The crude residue is recrystalised from IMS (1.9 l) washing with ice-cold IMS (2×150 mL) and dried in a vacuum oven at 70,° C. to give a light cream crystalline solid. 46.45 g, 78%.

Preparation of 2-iodo-6-hydroxy-naphthalene 1.3

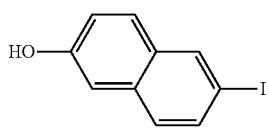
(1.3)

$BBr_3$ (102 g, 407 mmol) is added dropwise over 30 min to a slightly cloudy solution/suspension of 2-iodo-6-methoxy-naphthalene (45.4 g, 160 mmol) in dichloromethane (dried over 3 Å molecular sieves) (1 L) at −8° C. The mixture is warmed to 20° C. and stirred at this temp for 1.5 h. Water (400 mL) is carefully added (slow dropwise addition at the start) and the biphasic mixture vigorously stirred for 20 min. The layers are separated and the aqueous layer extracted with dichloromethane (250 mL) with additional water (400 mL) being added. The combined organic fractions are washed with water (500 mL), dried (Na2SO4), filtered and solvent removed in vacuo to give a colourless solid with silvery purple patches (44.7 g). This is recrystallised from IMS/water (initially dissolved in 100 mL IMS) washing with water and dried in a vacuum oven to give an off-white solid (40.3 g, 94%).

Preparation of Compound 1.4

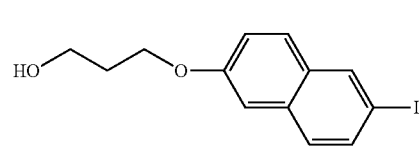
(1.4)

2-Iodo-6-hydroxy-naphthalene (117 g, 432 mmol), 3-bromopropanol (45 mL, 519 mmol) and N-methyl-2-pyrrolidinone (12.5 mL, 130 mmol) are charged to a 3-necked 5 L r.b.f. and dissolved in 2-butanone (2.4 L). Potassium carbonate (anhydrous, 153 g, 1.12 mol) is added and the reaction mixture heated at reflux for 3 h and then at 80° C. for 16 h. Additional 3-bromopropanol (7.5 ml, 86 mmol) is added and the reaction mixture heated at reflux for 6 h. A further portion of 3-bromopropanol (7.5 ml, 86 mmol) is added and the reaction mixture stirred at 80° C. for 24 h. The mixture is allowed to cool to r.t., the solids are removed by filtration and the solvent is removed in vacuo. The residue is recrystallised from dichloromethane/petroleum ether (b.p 40-60° C.) initially dissolving in hot dichloromethane (1 L), adding petroleum ether (b.p 40-60° C.) (30 mL) until cloudy and adding dichloromethane (approx. 30 mL) until it went clear. Once ice-cold the solid is collected by suction filtration washing with petroleum ether (b.p. 40-60° C.) (2×50 mL) and dried in a vacuum oven to give a pale yellow crystalline solid (98.2 g). The filtrate (106 g) is recrystallised from dichloromethane/petroleum ether (b.p 40-60° C.) initially dissolving in dichloromethane (100 mL), filtering and washed with petroleum ether (b.p 40-60° C.) (2×50 mL) then dried in a vacuum oven to give a light beige crystalline solid (21.4 g).

Overall yield 120 g, 84%.

Preparation of Compound 1.5

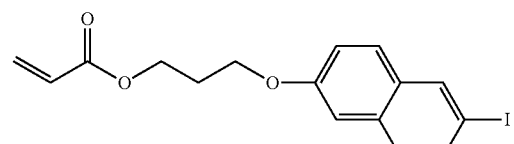
(1.5)

Triethylamine (150 mL, 1.08 mol) is added dropwise to a suspension of compound 1.4 (98.0 g, 299 mmol) in 3-chloropropionyl chloride (40 mL, 418 mmol) and dichloromethane (dried over 3 Å molecular sieves) (540 mL) at 0° C. The mixture is heated at 40° C. for 24 h, allowed to cool to r.t. and transferred to a separation funnel with dichloromethane (1.5 L). The mixture is washed with water (1.5 L) then brine (750 mL), dried ($Na_2SO_4$), filtered and solvent removed in vacuo. The crude residue (approx. 150 g) is columned on silica (600 g) eluting with dichloromethane to give a light orange/brown solid (111 g, 97%).

Preparation of Compound 1.6

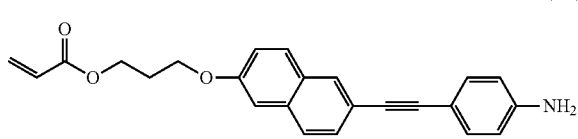
(1.6)

Compound 1.5 (15.2 g, 39.7 mmol) and 4-ethynylaniline (5.30 g, 45.3 mmol) are dissolved/partly suspended in triethylamine (37 mL)/anhydrous THF (74 mL). CuI (106 mg, 556 mmol) and Pd(PPh₃)₂Cl₂ (390 mg, 556 mmol) are added and the mixture stirred at rt. for 10 min and then at 50° C. for 19 h. The reaction mixture is allowed to cool to r.t. and then transferred to a separation funnel with dichloromethane (300 mL), washed with water (150 mL) and the aqueous layer is back-extracted with dichloromethane (3×100 mL). The combined organic fractions are dried (Na₂SO₄), filtered and solvent removed in vacuo. The crude residue is columned on silica (200 g) eluting with dichloromethane/ethyl acetate (1:1). The material obtained is too impure to recrystallise from dichloromethane/petroleum ether (b.p 40-60° C.) and is re-columned on silica gel eluting with dichloromethane to give a solid (14.6 g). This is recrystallised from dichloromethane/petroleum ether (b.p 40-60° C.) initially dissolving in dichloromethane (50 mL) and washing with dichloromethane/petroleum ether (b.p 40-60° C.) (1:2, 90 mL) and dried in a vacuum oven at 40° C. to give a light brown crystalline solid (8.05 g, 55%).

Preparation of Compound A1

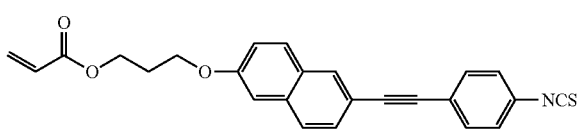
(A1)

1,1-Thiocarbonyldiimidazole (9.52 g, 53.44 mmol) is added in one portion to a stirred solution of compound 1.6 (7.95 g, 21.39 mmol) in dichloromethane (dried over 3 Å molecular sieves) (18 mL) at r.t. The reaction mixture is stirred at r.t. for 1.5 h (TLC 100% dichloromethane) The crude mixture is diluted with dichloromethane (50 mL), washed with water (50 mL)/brine (10 mL) and the aqueous layer is back-extracted with dichloromethane (2×50 mL). The combined organic extracts are washed with brine (50 mL), dried (Na₂SO₄), filtered and solvent removed in vacuo to give an orange solid (16.3 g). This is purified by column chromatography (160 g silica) eluting with dichloromethane/petroleum ether (b.p 40-60° C.) (2:1) to give a solid (7.09 g). This is dissolved in a minimal amount of warm dichloromethane (approx. 20 mL) and petroleum ether (b.p 40-60° C.) (approx. 80 mL) is added to precipitate the product, which is collected by suction filtration, washed with petroleum ether (b.p 40-60° C.) (20 mL) and dried in a vacuum oven at 40° C. to give a colourless solid (6.47 g, 73%).

Transition temperatures: K 115.5 N 143.4 I, Δn=0.455

The following compounds are prepared analogously:

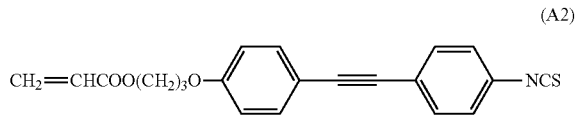
(A2)

Transition temperatures: K 80.7 I, Δn=0.387

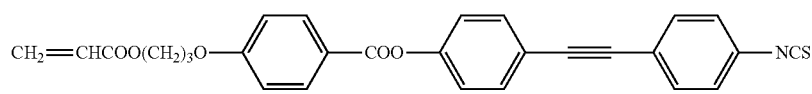
(A3)

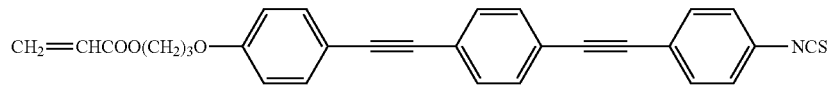
(A4)

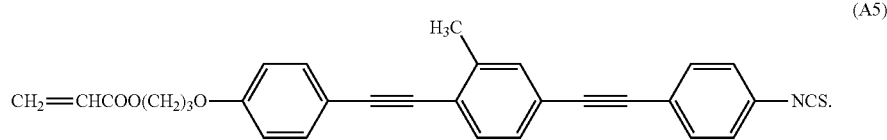
(A5)

Δn = 0.435

Example 2

A polymerisable LC mixture is formulated comprising the following compounds of components A)-F):

| | |
|---|---|
| (A1) | 10.00% |
| (B1) | 9.75% |
| (B2) | 25.44% |
| (B3) | 16.73% |
| (C1) | 15.00% |
| (D1) | 16.00% |
| (E1) | 3.00% |
| (E2) | 3.00% |
| (F1) | 1.00% |
| Irganox ® 1076 | 0.08% |

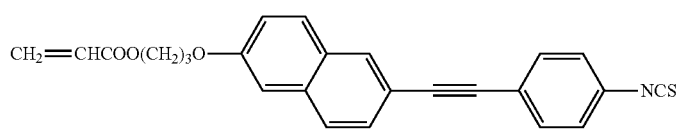
(A1)

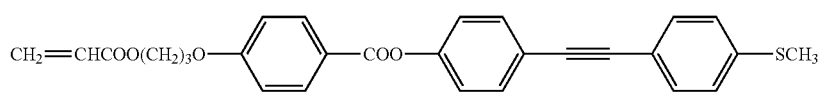
(B1)

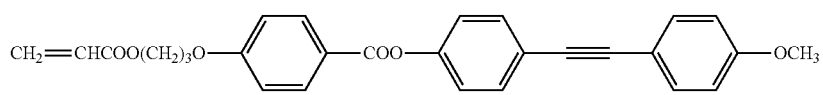
(B2)

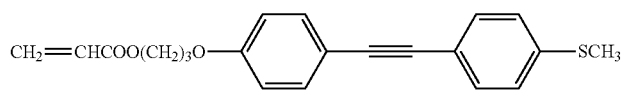
(B3)

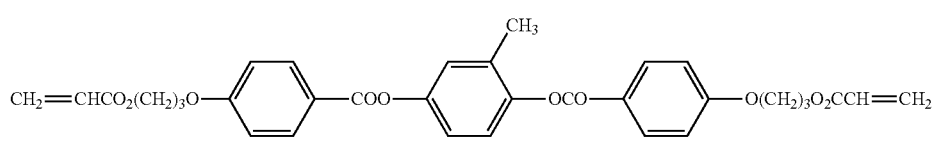
(C1)

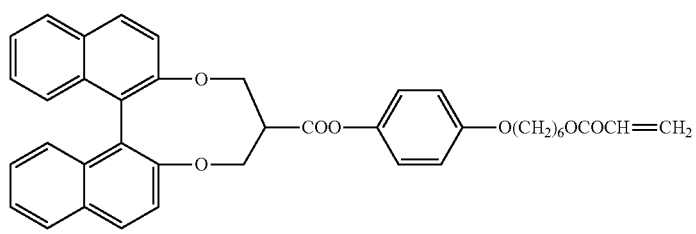
(D1)

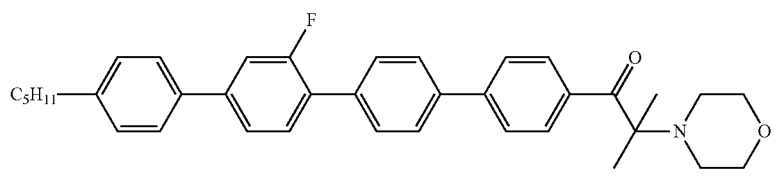
(E1)

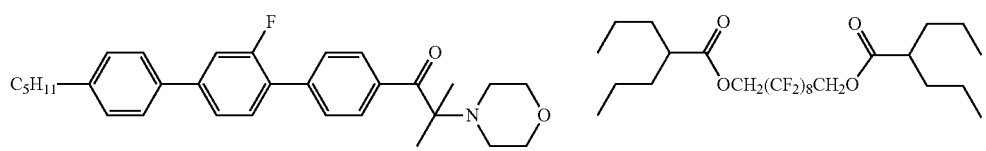
(E2) (F1)

Compounds B1 and B3 are described in GB 2 388 599 A1. Compound B2 can be prepared in analogy to the method described in U.S. Pat. No. 6,514,578 or US 2008/0143943 A1. Compound C1 can be prepared by the method described in Broer et al., Makromol. Chem. 190, 2255ff and 3201ff (1991), or in analogy thereto. Compound D1 can be prepared by the methods described in U.S. Pat. No. 7,223,450 or in analogy thereto. Compounds E1 and E2 are described in EP 1 388 538 A1. Compound F1 is described in GB 2 383 040 A1.

The mixture exhibits the following LC phase sequence: Ch 88.4 I

Figure 2:
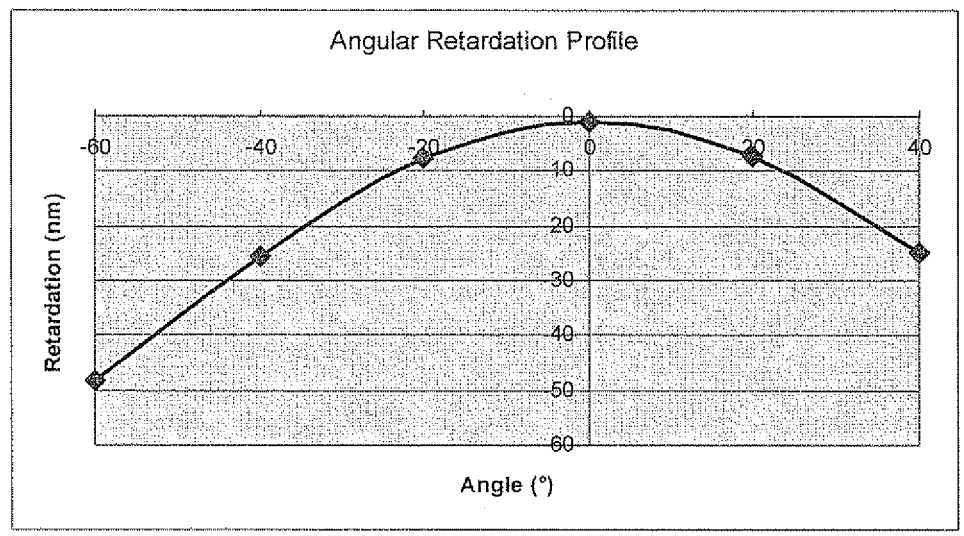
FIGS. 2-8 and 10 show the retardation profile (retardation versus viewing angle) of polymer films according to examples 2-9, respectively.

The mixture is converted to a 40% solution in toluene and filtered to 0.2 microns. The solution is then spin-coated onto rubbed polyimide coated glass at 4000 rpm for 30 seconds. The uncured film is annealed at 86° C. for 1 minute and then cured under an EFOS lamp fitted with a 365 nm bandpass filter for 1 minute in a nitrogen atmosphere using a cure temperature of 60° C. and a cure power of 200 mW/cm$^2$. The resulting polymer film has negative optical retardation and the optical properties of a negative C plate. The retardation profile is shown in FIG. 2.

The $R_{450}/R_{550}$ value is measured at angles of +40° and −40° as follows:

1.138 (+40°)

1.137 (−40°)

The negative C film has a high positive retardation dispersion.

Example 3

A polymerisable LC mixture is formulated comprising the following compounds of components A)-F):

| | |
|---|---|
| (A1) | 10.00% |
| (A2) | 10.00% |
| (B1) | 9.75% |
| (B2) | 25.44% |
| (B3) | 6.73% |
| (C1) | 15.00% |
| (D1) | 16.00% |
| (E1) | 3.00% |
| (E2) | 3.00% |
| (F1) | 1.00% |
| Irganox ® 1076 | 0.08% |

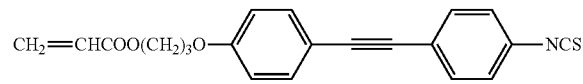
(A2)

The mixture exhibits the following LC phase sequence: Ch 79.2 I

Figure 3:
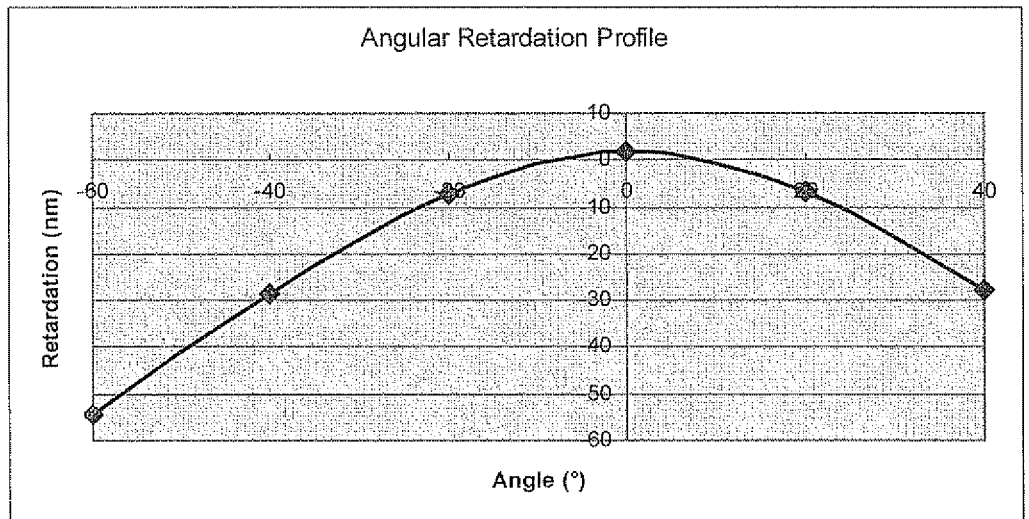

The mixture is converted to a 40% solution in toluene and filtered to 0.2 microns. The solution is then spin-coated onto rubbed polyimide coated glass at 4000 rpm for 30 seconds. The uncured film is annealed at 77° C. for 1 minute and then cured under an EFOS lamp fitted with a 365 nm bandpass filter for 1 minute in a nitrogen atmosphere using a cure temperature of 60° C. and a cure power of 200 mW/cm². The resulting polymer film has negative optical retardation and the optical properties of a negative C plate. The retardation profile is shown in FIG. 3.

The $R_{450}/R_{550}$ value is measured at angles of +40° and −40° as follows:
1.157 (+40°)
1.159 (−40°)

The negative C film has a high positive retardation dispersion.

Example 4

A polymerisable LC mixture is formulated comprising the following compounds of components A)-F):

| | |
|---|---|
| (A1) | 10.00% |
| (B2) | 25.44% |
| (B4) | 20.00% |
| (C1) | 21.48% |
| (D1) | 16.00% |
| (E1) | 3.00% |
| (E2) | 3.00% |
| (F1) | 1.00% |
| Irganox ® 1076 | 0.08% |

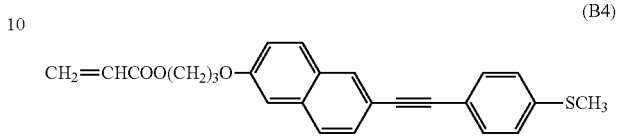
(B4)

Compound B4 can be prepared in analogy to the method described in this application or in GB 2 388 599 A1.

The mixture exhibits the following LC phase sequence: Ch 81.3 I

Figure 4:
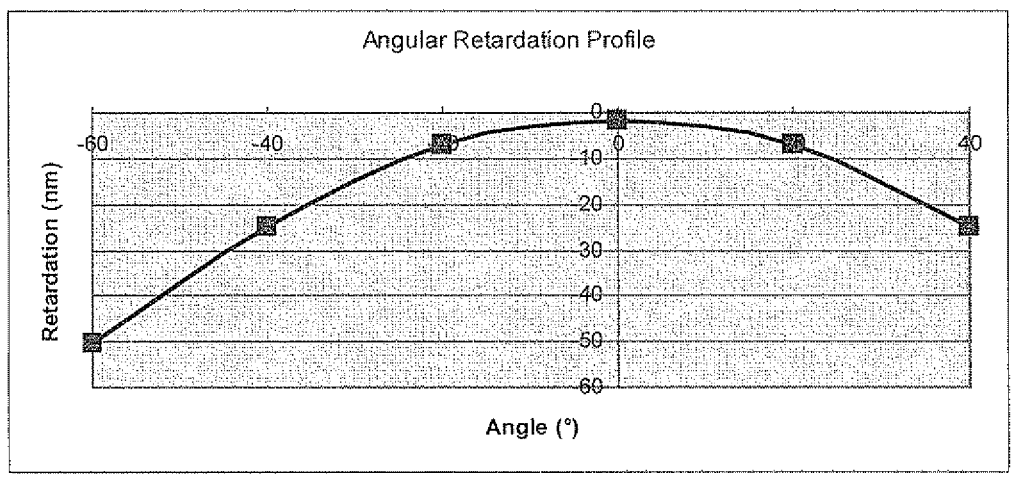

The mixture is converted to a 40% solution in toluene and filtered to 0.2 microns. The solution is then spin-coated onto rubbed polyimide coated glass at 4000 rpm for 30 seconds. The uncured film is annealed at 79° C. for 1 minute and then cured under an EFOS lamp fitted with a 365 nm bandpass filter for 1 minute in a nitrogen atmosphere using a cure temperature of 60° C. and a cure power of 200 mW/cm². The resulting polymer film has negative optical retardation and the optical properties of a negative C plate. The retardation profile is shown in FIG. 4.

The $R_{450}/R_{550}$ value is measured at angles of +40° and −40° as follows:
1.142 (+40°)
1.142 (−40°)

The negative C film has a high positive retardation dispersion.

Example 5

A polymerisable LC mixture is formulated comprising the following compounds of components A)-D) and F):

| | |
|---|---|
| (A1) | 17.23% |
| (B2) | 20.00% |
| (B5) | 14.69% |
| (C1) | 10.00% |
| (C2) | 20.00% |
| (D1) | 12.00% |
| (D2) | 4.00% |
| (F1) | 1.00% |
| Irgacure ® 651 | 1.00% |
| Irganox ® 1076 | 0.08% |

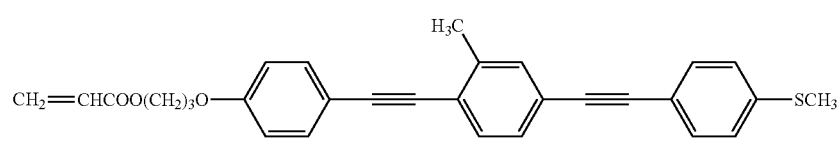
(B5)

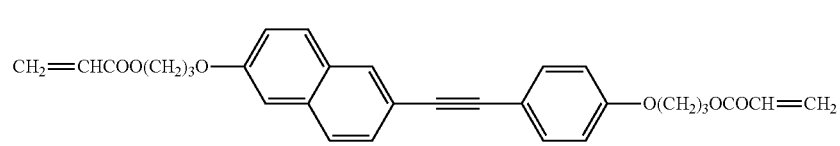
(C2)

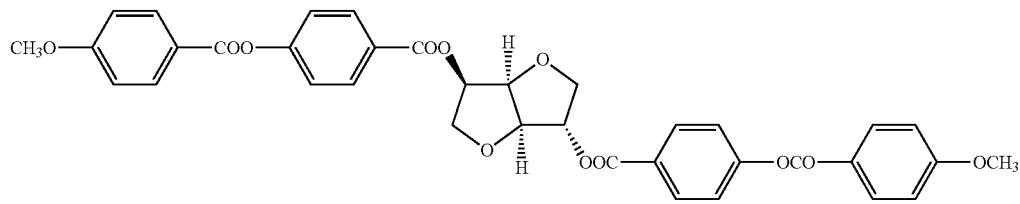

(D2)

Compound B5 can be prepared in analogy to the method described in GB 2 388 599 A1. Compound C2 can be prepared in analogy to the method described in this application or in U.S. Pat. No. 6,514,578 or US 2008/0143943 A1. Compound D2 is described in U.S. Pat. No. 6,217,792.

The mixture exhibits the following LC phase sequence: Ch 94.5 I

The mixture is converted to a 40% solution in toluene and filtered to 0.2 microns. The solution is then spin-coated onto rubbed polyimide coated glass at 4000 rpm for 30 seconds. The uncured film is annealed at 92° C. for 1 minute and then

| (C1) | 40.00% |
| (C3) | 10.00% |
| (G1) | 15.00% |
| (G2) | 15.92% |
| (D1) | 11.00% |
| (D2) | 3.00% |
| (F1) | 1.00% |
| Irgacure ® 907 | 4.00% |
| Irganox ® 1076 | 0.08% |

Figure 5:
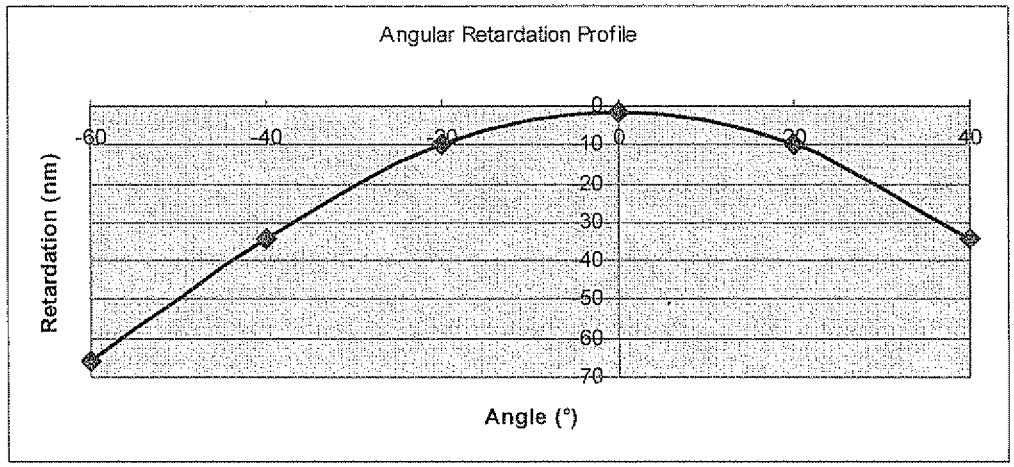

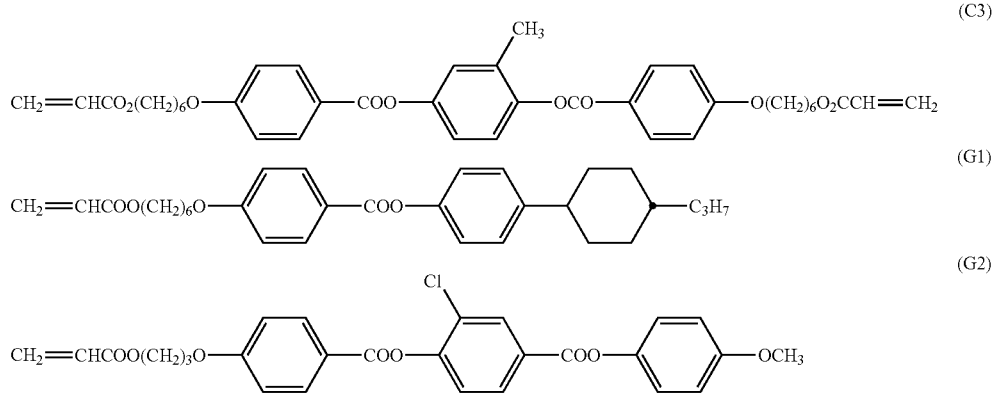

cured under an EFOS lamp fitted with a 365 nm bandpass filter for 1 minute in a nitrogen atmosphere using a cure temperature of 60° C. and a cure power of 200 mW/cm². The resulting polymer film has negative optical retardation and the optical properties of a negative C plate. The retardation profile is shown in FIG. 5.

The $R_{450}/R_{550}$ value is measured at angles of +40° and −40° as follows:

1.166 (+40°)

1.168 (−40°)

The negative C film has a high positive retardation dispersion.

Example 6

Comparative Example

A polymerisable LC mixture is formulated comprising the following compounds:

Compound C3 can be prepared by the method described in Broer et al., Makromol. Chem. 190, 2255ff and 3201ff (1991), or in analogy thereto. Compound G1 is described in U.S. Pat. No. 6,344,154. Compound G2 is described in U.S. Pat. No. 6,491,990.

The mixture exhibits the following LC phase sequence: Ch 66.2 I

Figure 6:
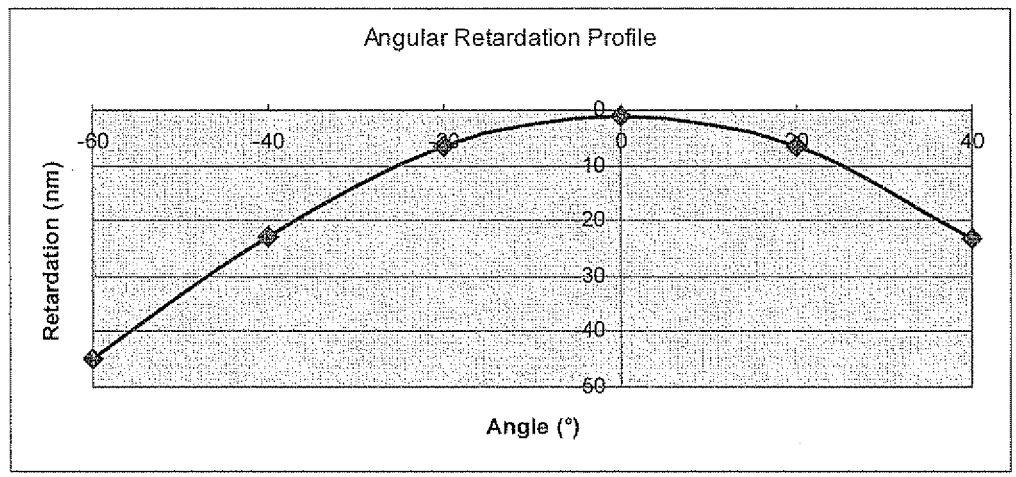

The mixture is converted to a 40% solution in 7:3 toluene: cyclohexanone and filtered to 0.2 microns. The solution is then spin-coated onto rubbed polyimide coated glass at 3000 rpm for 30 seconds. The uncured film is annealed at 64° C. for 1 minute and then cured under an EFOS lamp fitted with a 250-450 nm bandpass filter for 1 minute in air at room temperature using a cure power of 200 mW/cm². The resulting polymer film has negative optical retardation and the optical properties of a negative C plate. The retardation profile is shown in FIG. 6.

The $R_{450}/R_{550}$ value is measured at angles of +40° and −40° as follows:

1.081 (+40°)

1.083 (−40°)

The negative C film made from the mixture of Example 6 that does not contain a compound of formula I has a significantly lower positive retardation dispersion, compared to the films of Examples 1-5 made from mixtures containing compounds of formula I (component A).

Example 7

A polymerisable LC mixture is formulated comprising the following compounds of components A)-C) and F):

| | |
|---|---|
| (A1) | 5.00% |
| (B2) | 9.86% |
| (B3) | 6.10% |
| (B6) | 18.84% |
| (B7) | 28.68% |
| (C1) | 29.44% |
| (F1) | 1.00% |
| Irgacure ® 651 | 1.00% |
| Irganox ® 1076 | 0.08% |

| | |
|---|---|
| Irgacure ® 651 | 1.00% |
| Irganox ® 1076 | 0.08% |

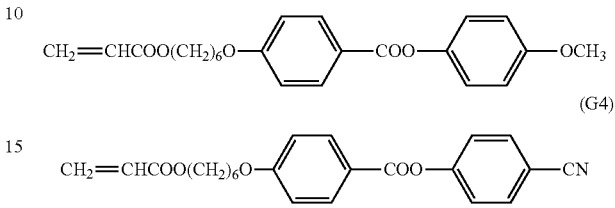

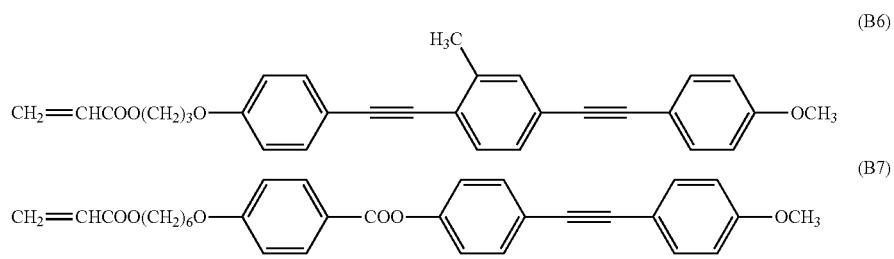

Compounds B6 and B7 can be prepared in analogy to the method described in U.S. Pat. No. 6,514,578 or US 2008/0143943 A1.

The mixture exhibits the following LC phase sequence: N 157.4 I

Figure 7:
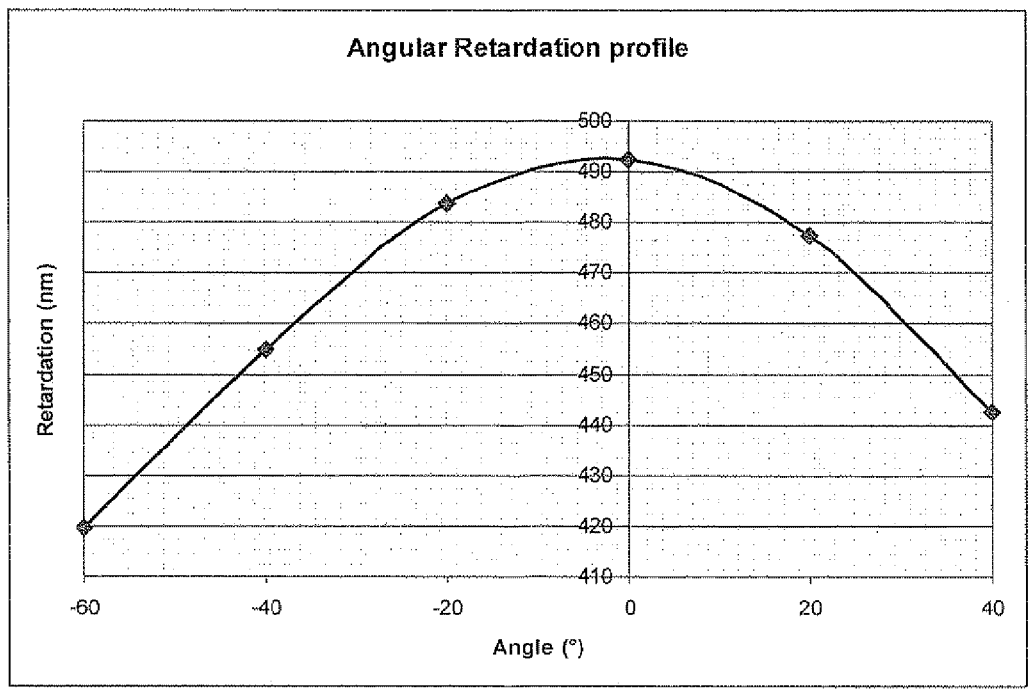

The mixture is converted to a 40% solution in toluene and filtered to 0.2 microns. The solution is spin-coated onto rubbed polyimide coated glass at 4000 rpm for 30 seconds and then cured under an EFOS lamp fitted with a 250-450 nm bandpass filter for 1 minute in a nitrogen atmosphere at room temperature using a cure power of 170 mW/cm². The resulting polymer film has positive optical retardation and the optical properties of a positive A plate. The retardation profile is shown FIG. 7.

The $R_{450}/R_{550}$ value is measured at angles of +40° and −40° as follows:
1.200 (+40°)
1.200 (−40°)

The positive A film has a high positive retardation dispersion.

Example 8

Comparative Example

A polymerisable LC mixture is formulated comprising the following compounds:

| | |
|---|---|
| (C1) | 39.60% |
| (C3) | 9.72% |
| (F1) | 1.00% |
| (G3) | 24.60% |
| (G4) | 24.60% |
| Irgacure ® 651 | 1.00% |
| Irganox ® 1076 | 0.08% |

Compounds (G3) and (G4) are known from the literature and can be prepared for example by the method as described in Whitcombe et al., J. Polym. Sci. Polym. Chem. 29, 251-259 (1991), or in analogy thereto.

The mixture exhibits the following LC phase sequence: N 74.7 I

Figure 8:
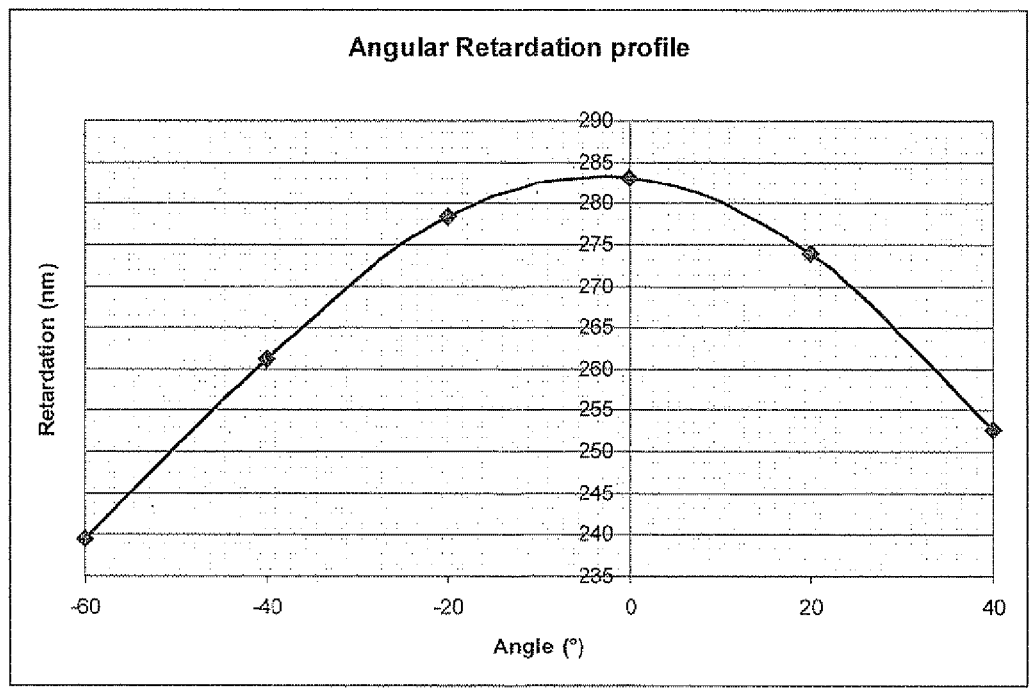

The mixture is converted to a 40% solution in toluene and filtered to 0.2 microns. The solution is spin-coated onto rubbed polyimide coated glass at 4000 rpm for 30 seconds and then cured under an EFOS lamp fitted with a 250-450 nm bandpass filter for 1 minute in a nitrogen atmosphere at room temperature using a cure power of 170 mW/cm². The resulting polymer film has positive optical retardation and the optical properties of a positive A plate. The retardation profile is shown FIG. 8.

The $R_{450}/R_{550}$ value is measured at angles of +40° and −40° as follows:
1.109 (+40°)
1.110 (−40°)

The positive A film has a high positive retardation dispersion.

Figure 9:
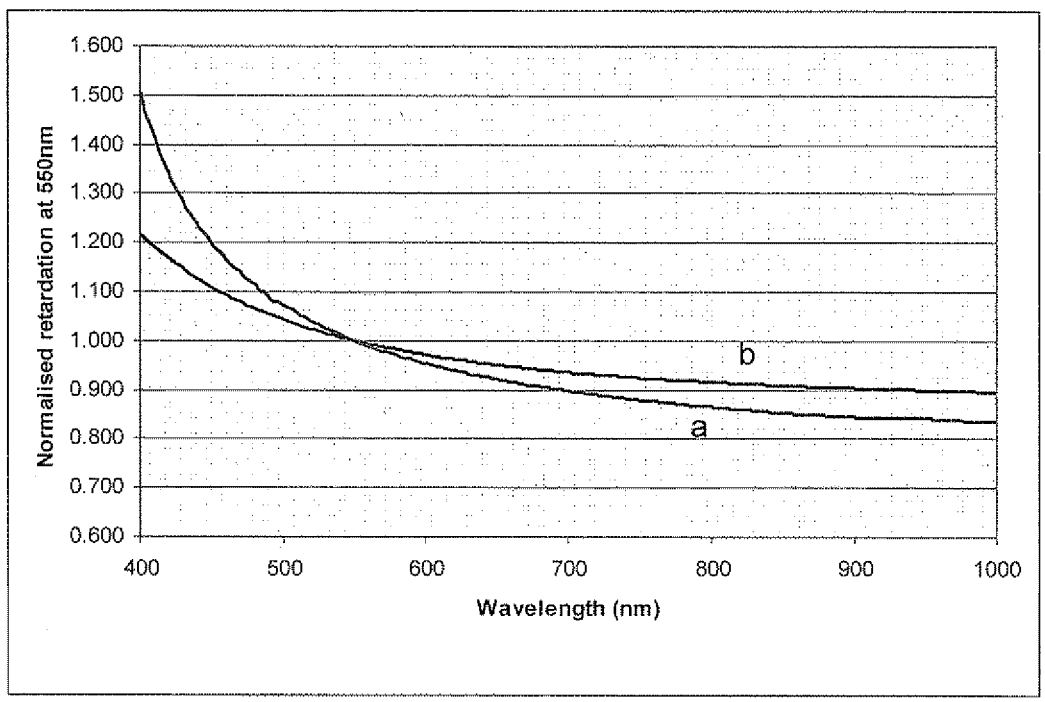
FIG. 9 shows the normalized retardation at 550 nm for polymer films of example 7 and 8.

FIG. 9 shows a comparison of the normalized retardation at 550 nm for the film of Example 7 (a) and the film of Comparative Example 8 (b). It can be seen that the film of Example 7 comprising a compound of formula I has a significantly higher retardation dispersion than the film of Example 8 containing no compounds of formula I.

Example 9

A polymerisable LC mixture is formulated comprising the following compounds of components A)-G):

| | |
|---|---|
| (A1) | 5.00% |
| (B7) | 31.92% |
| (C1) | 15.00% |
| (D1) | 16.00% |
| (E1) | 3.00% |
| (E2) | 3.00% |
| (F1) | 1.00% |
| (G1) | 25.00% |
| Irganox ® 1076 | 0.08% |

The mixture exhibits the following LC phase sequence: Ch 82.1 I

Figure 10:
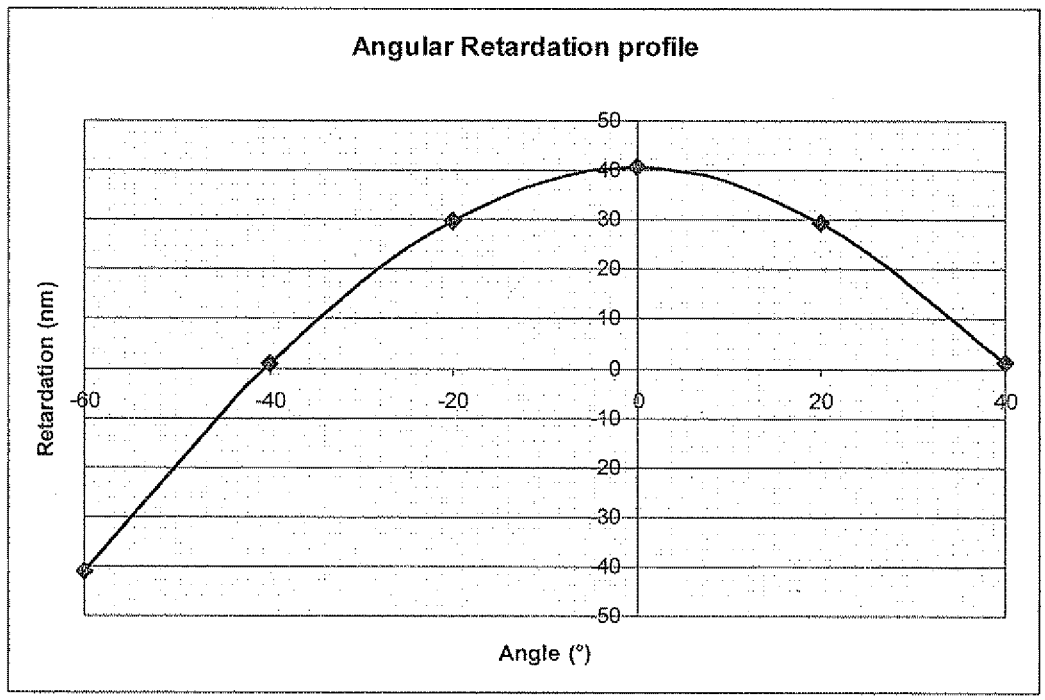

The mixture is converted to a 40% solution in toluene and filtered to 0.2 microns. The solution is spin-coated onto rubbed polyimide coated glass at 2000 rpm for 30 seconds. The uncured film is annealed at 80° C. for 1 minute and then cured under an EFOS lamp fitted with a 365 nm bandpass filter through a UV linear polariser for 1 minute in a nitrogen atmosphere at 60° C. using a cure power of 40 mW/cm². The resulting polymer film has the optical properties of a biaxial negative C plate. The retardation profile is shown FIG. 10.

The invention claimed is:

1. A compound of formula I

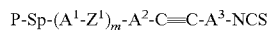
$$P\text{-}Sp\text{-}(A^1\text{-}Z^1)_m\text{-}A^2\text{-}C{\equiv}C\text{-}A^3\text{-}NCS \qquad I$$

wherein
P is a polymerizable group,
Sp is a spacer group or a single bond,
$A^1$ is, in case of multiple occurrences independently of one another, a carbocylic, heterocyclic, aromatic or heteroaromatic group, which is optionally substituted by one or more groups L,
$A^2$ and $A^3$ are, independently of each other, 1,4-phenylene or naphthalene-2,6-diyl, in which one or more CH groups are optionally replaced by N, and which are optionally substituted by one or more groups L,
$Z^1$ is, in case of multiple occurrences independently of one another, —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond,
L is, in case of multiple occurrences independently of one another, P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, in which one or more H atoms are optionally replaced by F or Cl,
X is halogen,
$R^0$ and $R^{00}$ are, independently of each other, H or alkyl with 1 to 12 C-atoms, and
m is 0, 1, 2, 3 or 4,
wherein, in case m is 0, one or both of $A^2$ and $A^3$ denote 1,4-phenylene that is at least monosubstituted by L, or optionally substituted naphthalene-2,6-diyl.

2. A compound according to claim 1, wherein $A^1$, $A^2$ and $A^3$ denote 1,4-phenylene or naphthalene 2,6-diyl that is optionally substituted with one or more groups L.

3. A compound according to claim 1, wherein $Z^1$ is —COO—, —OCO—, —C≡C— or a single bond and m is 0 or 1.

4. A compound according to claim 1, which is one of the following compounds

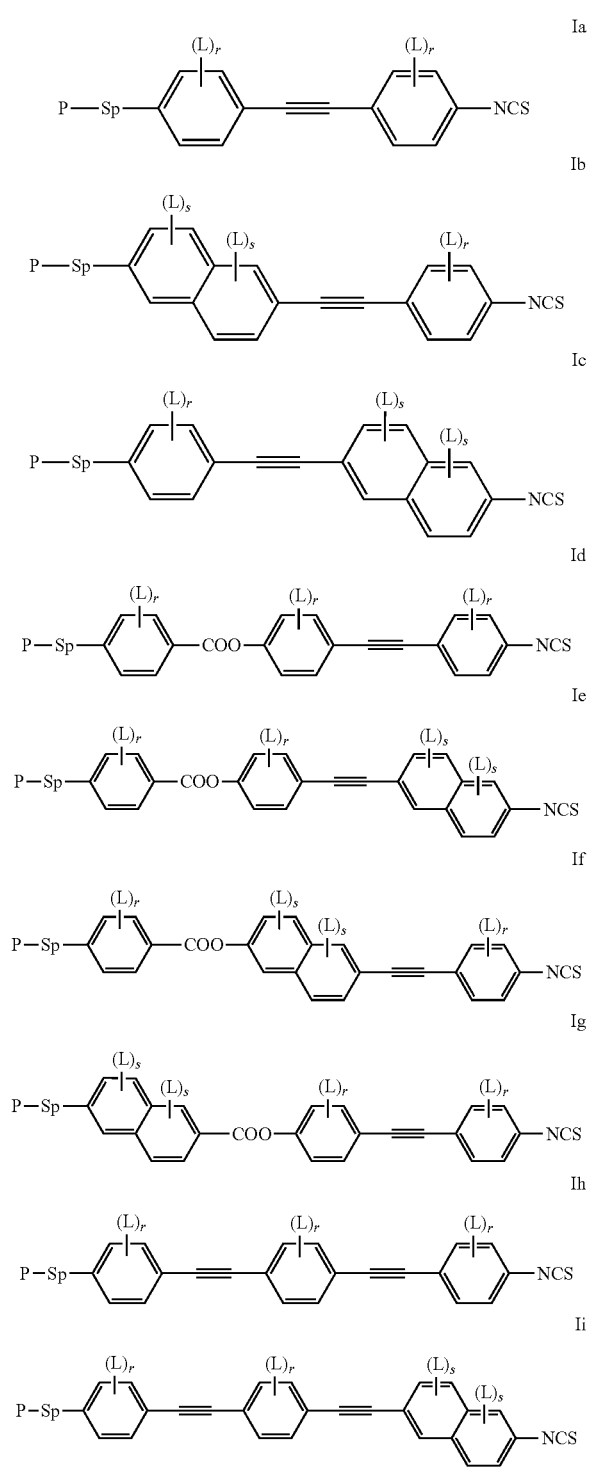

-continued

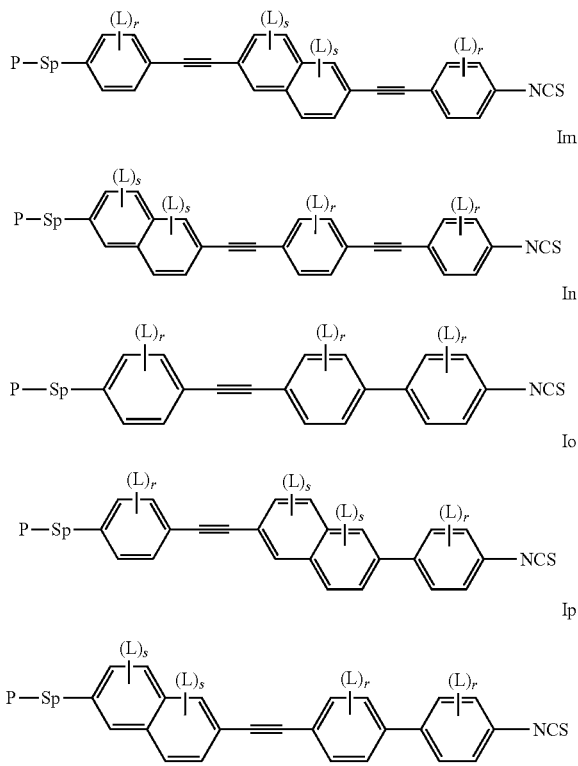

wherein
P, Sp and L have the meanings given for the compound of formula I,
r is, each independently, 0, 1, 2, 3 or 4, and
s is, each independently, 0, 1, 2 or 3.

5. A polymerizable liquid crystalline material, comprising one or more compounds according to claim 1, and one or more further compounds that are polymerizable and/or mesogenic or liquid crystalline.

6. A polymerizable liquid crystalline material, comprising the following components
a) one or more compounds according to claim 1,
b) one or more compounds of formula II

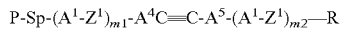

wherein
$A^4$ and $A^5$ are, independently of each other, an aromatic or heteroaromatic group, which is optionally substituted,
R is P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, in which one or more H atoms are optionally replaced by F or Cl,
X is halogen,
m1 and m2 are, independently of each other, 0, 1, 2, 3 or 4, with m1+m2<5, and
P, Sp, $A^1$,
$Z^1$, L, $R^0$ and $R^{00}$ have the meanings given for the compound of formula I,
c) one or more polymerizable mesogenic compounds having two or more polymerizable groups,
d) optionally one or more chiral compounds,
e) optionally one or more polymerization initiators, and
f) optionally one or more surfactants.

7. A polymerizable liquid crystalline material according to claim 6, wherein in a compound of formula II, R is CN, OCH$_3$ or SCH$_3$ or denotes P-Sp- as defined in claim 6.

8. A polymerizable liquid crystalline material according to claim 6, wherein in a compound of formula II, $A^1$, $A^4$ and $A^5$ are, each independently, 1,4-phenylene or naphthalene 2,6-diyl which are optionally substituted with one or more groups L.

9. A polymerizable liquid crystalline material according to claim 6, wherein in a compound of formula II, $Z^1$ is —COO—, —OCO—, —C≡C— or a single bond, m1 is 0 or 1 and m2 is 0.

10. A polymerizable liquid crystalline material according to claim 6, wherein a compound of formula II is one of the following compounds

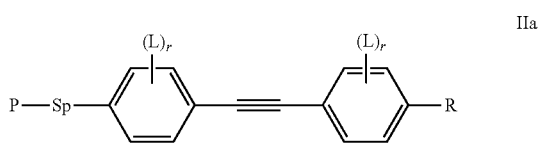

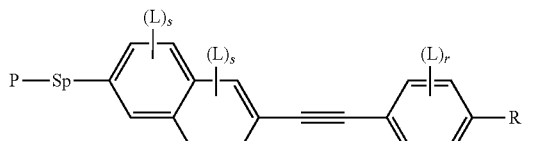

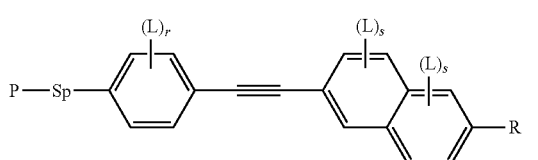

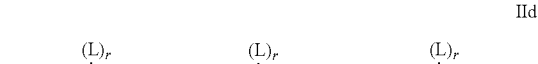
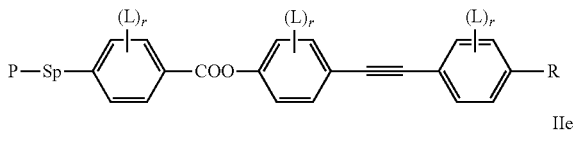

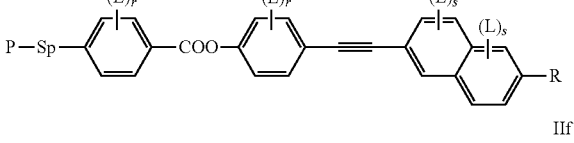

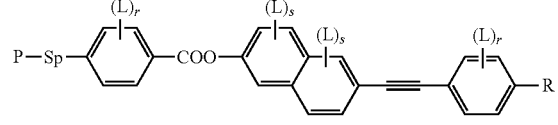

-continued

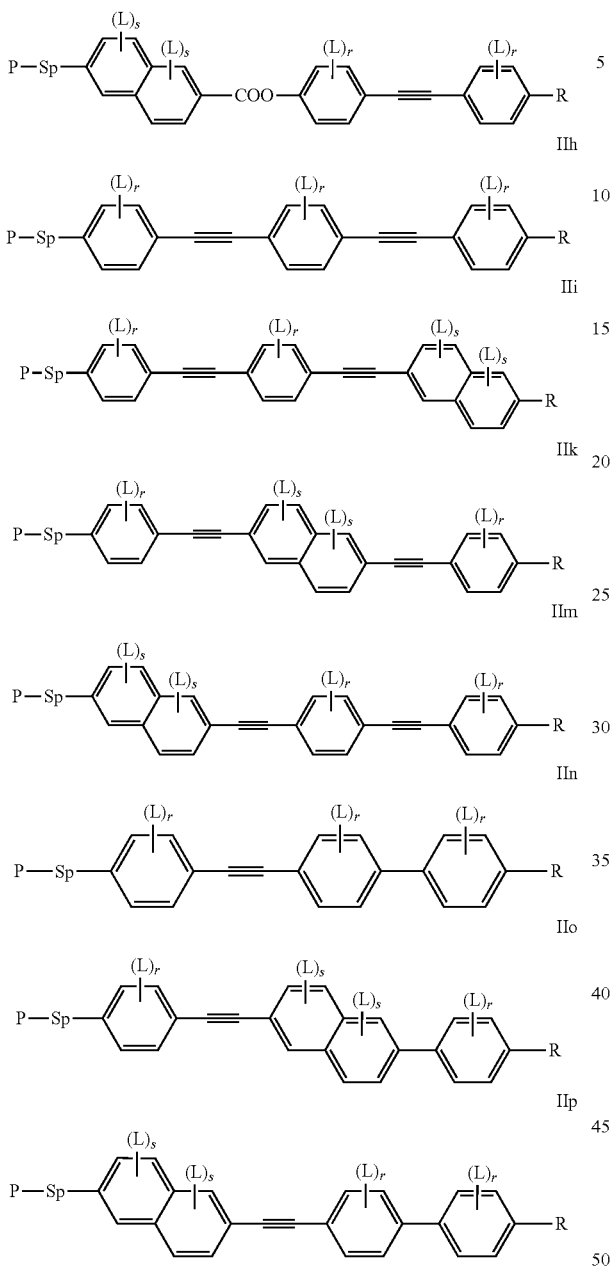

wherein
P, Sp, L and R have the meanings given for the compound of formula II,
r is 0, 1, 2, 3 or 4, and
s is 0, 1, 2 or 3.

11. A polymerizable liquid crystalline material according to claim 6, wherein a compound of component c) is a compound of formula III P-Sp-MG-Sp-P    III wherein P and Sp have, in each occurrence independently of one another, the meanings given for the compound of formula I, and MG is a rod-like mesogenic group that is optionally chiral and is of formula IV -(A$^{11}$-Z$^{11}$)$_m$-A$^{22}$-    IV wherein
A$^{11}$ and A$^{22}$ are, in case of multiple occurrences independently of one another, an aromatic or alicyclic group, which optionally contains one or more heteroatoms selected from the group consisting of N, O and S, and is optionally mono- or polysubstituted by L,
Z$^{11}$ in case of multiple occurrences independently of one another denotes —O—, —S—, —CO—, —COO—, —OCO—, —S—CO—, —CO—S—, —O—COO—, —CO—NR$^0$—, —NR$^0$—CO—, —NR$^0$—CO—NR$^{00}$—, —NR$^0$—CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH═N—, —N═CH—, —N═N—, —CH═CR$^0$—, —CY$^1$═CY$^2$—, —C≡C—, —CH═CH—COO—, —OCO—CH═CH— or a single bond,
R$^0$ and R$^{00}$ independently of each other denote H or alkyl with 1 to 12 C-atoms,
Y$^1$ and Y$^2$ independently of each other denote H, F, Cl or CN, and
m is 0, 1, 2, 3 or 4.

12. A polymerizable liquid crystalline material according to claim 6, wherein a compound of component c) is one of the following compounds

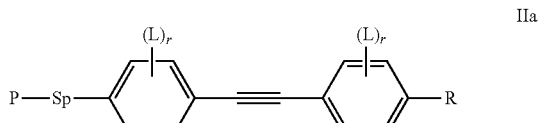

IIa

IIb

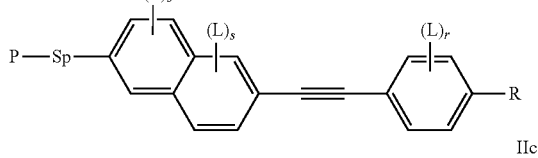

IIc

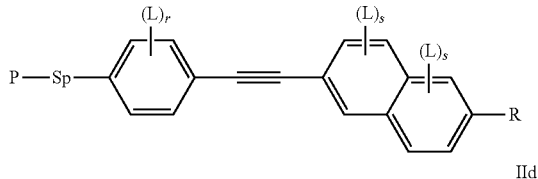

IId

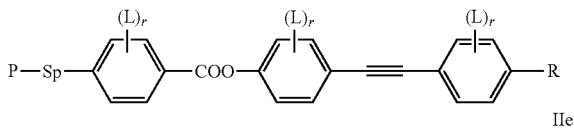

IIe

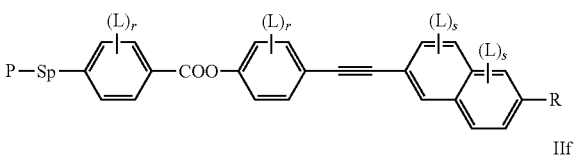

IIf

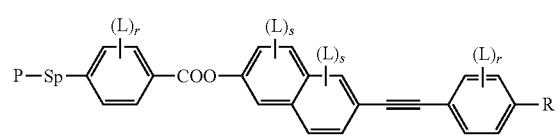

-continued

IIg
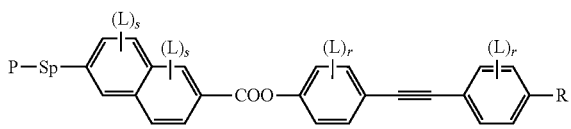

IIh
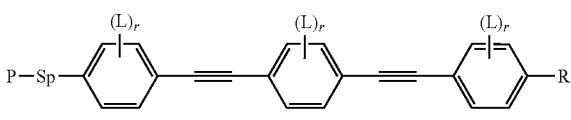

IIi
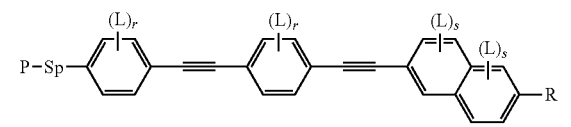

IIk
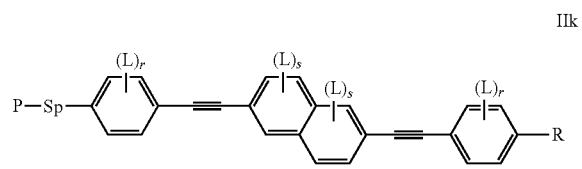

IIm
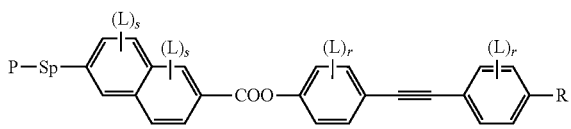

IIn
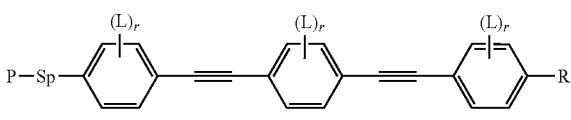

IIo
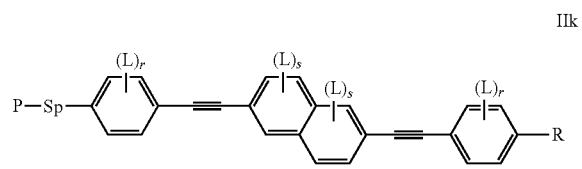

IIp

(DR1)
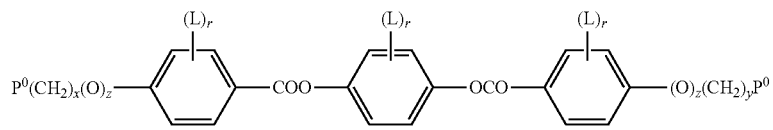

(DR2)
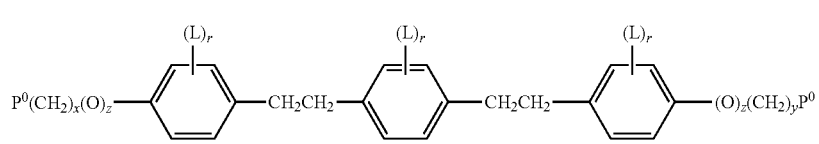

(DR3)
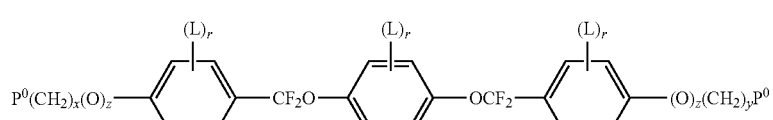

(DR4)
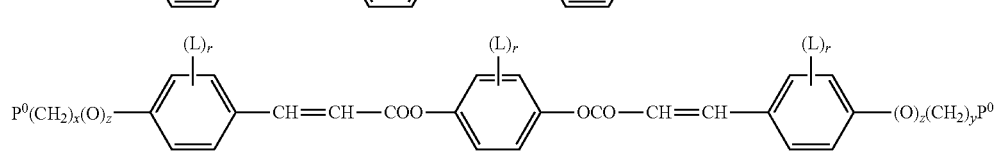

(DR5)
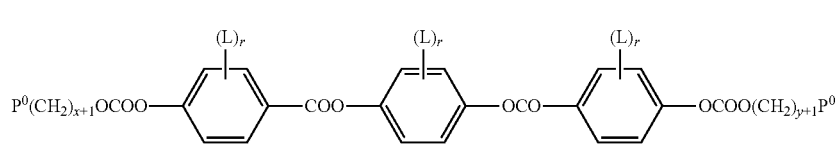

wherein
P, Sp,
L and R have the meanings given for the compound of formula II,
s is 0, 1, 2 or 3
$P^0$ is, in case of multiple occurrences independently of one another, a polymerizable group,
L is, in case of multiple occurrences independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
x and y are, independently of each other, 0 or identical or different integers from 1 to 12, and z is 0 or 1, with z being 0 if the adjacent x or y is 0,
and wherein the benzene rings can additionally be substituted with one or more identical or different groups L.

13. A polymerizable liquid crystalline material according to claim 5, which comprises one or more polymerization initiators selected from the group consisting of dichroic and liquid crystalline photoinitiators.

14. A product selected from the group consisting of electrooptical displays, liquid crystal displays, optical films, polarizers, compensators, beam splitters, reflective films, alignment layers, colour filters, holographic elements, hot stamping foils, coloured images, decorative markings, security markings, liquid crystal pigments, adhesives, cosmetics, diagnostics, non-linear optics, optical information storage, electronic devices, organic semiconductors, field effect transistors, components of integrated circuitry, thin film transistors, Radio Frequency Identification tags, organic light emitting diodes, electroluminescent displays, lighting devices, photovoltaic devices, sensor devices, electrode materials, photoconductors, electrophotographic recording, lasing materials and lasing devices, comprising a compound according to claim 1 in said product.

15. A method for preparing a compound according to claim 1, comprising
    a) etherifying of the OH group of a p-halogen substituted aromatic alcohol with the halogen group of an co-halogen substituted aliphatic alcohol,
    b) reacting the aliphatic OH group of the ether prepared in a) with a compound capable of providing a polymerizable group, thereby forming an ester,
    c) reacting the aromatic halogen group of the ester prepared in b) with a p-amino arylacetylene to give a p-amino tolane, and
    d) treating the amino group of the tolane prepared in c) with 1,1'-thiocarbonyldiamidazole to give a p-isothiocyanato tolane.

16. A compound according to claim 1, wherein
L is, in case of multiple occurrences independently of one another, P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, silyl, aryl or heteroaryl with 1 to 12 C atoms, or straight chain or branched alkyl, alkoxy, alkylcarbonyl, alkoxycarbonyl, alkylcarbonyloxy or alkoxycarbonyloxy with 1 to 12 C atoms, in which one or more H atoms are optionally replaced by F or Cl.

17. A polymerizable liquid crystalline material according to claim 6, wherein in a compound of formula II,
A$^4$ and A$^5$ are, independently of each other, 1,4-phenylene or naphthalene-2,6-diyl, in which one or more CH groups are optionally replaced by N, and which are optionally substituted by one or more groups L.

18. A method according to claim 15, further comprising
    e) optionally converting the protected version of the polymerizable group of the isothiocynanato tolane of d).

19. A compound according to claim 1, wherein at least one of A$^1$, A$^2$ and A$^3$ denote naphthalene 2,6-diyl that is optionally substituted with one or more groups L.

20. A compound according to claim 1, wherein at least two of A$^1$, A$^2$ and A$^3$ denote 1,4-phenylene that is substituted with one or more groups L.

21. A compound according to claim 1, wherein m is 1.

22. A compound according to claim 4, which is a compound of formula Ib to Ip.

23. A compound according to claim 4, which is a compound of formula Ia, wherein r is, each independently, 1, 2, 3 or 4.

24. A polymerizable liquid crystalline material according to claim 6, wherein
    c) the one or more polymerizable mesogenic compounds having two or more polymerizable groups, are a compound of component a), b) or d),
    and/or
    d) the optional one or more chiral compounds, are a compound of component a), b) or c).

* * * * *

UNITED STATES PATENT AND TRADEMARK OFFICE
CERTIFICATE OF CORRECTION

PATENT NO. : 8,455,563 B2
APPLICATION NO. : 12/812264
DATED : June 4, 2013
INVENTOR(S) : Owain Llyr Parri et al.

It is certified that error appears in the above-identified patent and that said Letters Patent is hereby corrected as shown below:

In the Claims:

Column 53, Line 26 reads: "aromatic alcohol with the halogen group of an co-halo-" should read -- aromatic alcohol with the halogen group of an ω-halo- --.

Signed and Sealed this
Fifteenth Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO.       : 8,455,563 B2
APPLICATION NO.  : 12/812264
DATED            : June 4, 2013
INVENTOR(S)      : Parri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 306 days.

Signed and Sealed this
Eighth Day of September, 2015

Michelle K. Lee
*Director of the United States Patent and Trademark Office*